United States Patent
Pinckney et al.

(10) Patent No.: US 7,958,066 B2
(45) Date of Patent: Jun. 7, 2011

(54) INTERACTIVE MACHINE LEARNING ADVICE FACILITY

(75) Inventors: Thomas Pinckney, Brighton, MA (US); Chris Dixon, New York, NY (US); Matthew Ryan Gattis, New York, NY (US)

(73) Assignee: Hunch Inc., New York, NY (US)

( * ) Notice: Subject to any disclaimer, the term of this patent is extended or adjusted under 35 U.S.C. 154(b) by 294 days.

(21) Appl. No.: 12/262,862

(22) Filed: Oct. 31, 2008

(65) Prior Publication Data

US 2009/0119234 A1 May 7, 2009

Related U.S. Application Data

(60) Provisional application No. 60/984,948, filed on Nov. 2, 2007, provisional application No. 61/060,226, filed on Jun. 10, 2008, provisional application No. 61/097,394, filed on Sep. 16, 2008.

(51) Int. Cl.
*G06F 15/18* (2006.01)
(52) U.S. Cl. ............. 706/12; 706/45; 706/46; 706/47; 706/52; 706/62; 707/705; 707/706; 707/708; 707/709; 707/710; 707/713
(58) Field of Classification Search .................. None
See application file for complete search history.

(56) References Cited

U.S. PATENT DOCUMENTS

| | | | |
|---|---|---|---|
| 6,064,978 A * | 5/2000 | Gardner et al. ............ | 705/10 |
| 6,767,325 B2 * | 7/2004 | Iliff ............................. | 600/300 |
| 7,293,019 B2 | 11/2007 | Dumais et al. | |
| 7,519,529 B1 * | 4/2009 | Horvitz ........................ | 704/7 |
| 7,716,236 B2 | 5/2010 | Sidhu et al. | |
| 2003/0065636 A1 * | 4/2003 | Peyrelevade ................ | 706/62 |
| 2004/0236981 A1 * | 11/2004 | Karpf ........................... | 714/1 |
| 2005/0055321 A1 * | 3/2005 | Fratkina et al. ............. | 706/45 |
| 2005/0086187 A1 * | 4/2005 | Grosser et al. ............. | 706/47 |
| 2005/0260549 A1 * | 11/2005 | Feierstein et al. .......... | 434/236 |
| 2006/0173985 A1 | 8/2006 | Moore | |
| 2006/0230008 A1 | 10/2006 | Burgener | |

(Continued)

FOREIGN PATENT DOCUMENTS

WO   WO-2007118202 A2   10/2007

(Continued)

OTHER PUBLICATIONS

"U.S. Appl. No. 12/503,263, Non-Final Office Action mailed Sep. 29, 2010", , 20.

(Continued)

*Primary Examiner* — Omar F Fernandez Rivas
(74) *Attorney, Agent, or Firm* — Strategic Patents, P.C.

(57) ABSTRACT

In embodiments of the present invention improved capabilities are described for helping a user make a decision through the use of a machine learning facility. The process may begin with an initial question being received by the machine learning facility from the user. The user may then be provided with a dialog consisting of questions from the machine learning facility and answers provided by the user. The machine learning facility may then provide a decision to the user based on the dialog and pertaining to the initial question, such as a recommendation, a diagnosis, a conclusion, advice, and the like. In embodiments, future questions and decisions provided by the machine learning facility may be improved through feedback provided by the user.

19 Claims, 17 Drawing Sheets

U.S. PATENT DOCUMENTS

| | | |
|---|---|---|
| 2007/0078884 A1 | 4/2007 | Ott, IV et al. |
| 2007/0100653 A1* | 5/2007 | Ramer et al. ............... 705/1 |
| 2007/0143281 A1 | 6/2007 | Smirin et al. |
| 2007/0207449 A1 | 9/2007 | Feierstein |
| 2008/0005075 A1* | 1/2008 | Horvitz et al. ............... 707/3 |
| 2008/0086504 A1* | 4/2008 | Sanders et al. ............ 707/104.1 |
| 2008/0126476 A1 | 5/2008 | Nicholas et al. |
| 2008/0140674 A1 | 6/2008 | Ishikawa |
| 2008/0162393 A1 | 7/2008 | Iliff |
| 2008/0189621 A1 | 8/2008 | Reich et al. |
| 2008/0214204 A1 | 9/2008 | Ramer et al. |
| 2009/0077022 A1 | 3/2009 | Cuthbert |
| 2009/0307159 A1 | 12/2009 | Pinckney et al. |
| 2010/0010913 A1 | 1/2010 | Pinckney et al. |
| 2010/0017348 A1 | 1/2010 | Pinckney et al. |
| 2010/0312650 A1 | 12/2010 | Pinckney et al. |
| 2010/0312724 A1 | 12/2010 | Pinckney et al. |

FOREIGN PATENT DOCUMENTS

| | | |
|---|---|---|
| WO | WO-2010/144766 A1 | 12/2010 |

OTHER PUBLICATIONS

"U.S. Appl. No. 12/503,334, Non-Final Office Action mailed Sep. 29, 2010", , 18 pgs.

"International Application Serial No. PCT/US10/38259 Search Report and Written Opinion mailed Sep. 17, 2010", , 13.

* cited by examiner

REMEMBERED ANSWERS

810

| QUESTION: | ANSWER: | PUBLIC / PRIVATE REMOVE: |
|---|---|---|
| BOXERS OR BRIEFS? | BOXERS | ⊗ |
| ARE YOU DRAWN TO: | CREDIBLE ASSUMPTIONS | ⊗ |
| ARE YOU GENERALLY MORE: | CONCEPTUAL | ⊗ |
| ARE YOUR THOUGHTS MOSTLY: | IMAGINATIVE | ⊗ |
| WHICH IS MORE TRUE OF YOURSELF: | PUT THINGS OFF | ⊗ |
| ARE YOU USUALLY MORE INTERESTED IN: | GENERAL THEORY | ⊗ |
| WHICH CELEBRITY DO YOU FIND MOST ATTRACTIVE: | PHOTO | ⊗ |
| HOW DO YOU MANAGE YOUR TIME? | LEISURELY | ⊗ |

PROS & CONS FROM PEOPLE LIKE YOU

1100

USER NAME
USER IMAGE
DEMOGRAPHIC

23 MINUTES AGO – 288 PEOPLE FOUND THIS REVIEW HELPFUL

PROS

CONS

DID THIS HELP? YES NO

USER NAME
USER IMAGE
DEMOGRAPHIC

23 MINUTES AGO – 288 PEOPLE FOUND THIS REVIEW HELPFUL

PROS

CONS

DID THIS HELP? YES NO

WRITE YOUR OWN PROS AND CONS

PROS

CONS

SUBMIT

TOPIC: POWER MOWERS

| | | |
|---|---|---|
| 49% | MOWER #1 IMAGE | DESCRIPTION TITLE<br>DETAILED DESCRIPTION<br>LISTED AT 'LOCATION' FOR 'PRICE' | DO YOU AGREE WITH THIS DECISION?<br>YES / NO |
| 36% | MOWER #2 IMAGE | DESCRIPTION TITLE<br>DETAILED DESCRIPTION<br>LISTED AT 'LOCATION' FOR 'PRICE' | DO YOU AGREE WITH THIS DECISION?<br>YES / NO |
| 30% | MOWER #3 IMAGE | DESCRIPTION TITLE<br>DETAILED DESCRIPTION<br>LISTED AT 'LOCATION' FOR 'PRICE' | DO YOU AGREE WITH THIS DECISION?<br>YES / NO |

DISPLAYING FIRST 3 RESULTS

1200

INTERACTIVE MACHINE LEARNING ADVICE FACILITY

CROSS-REFERENCE TO RELATED APPLICATIONS

This application claims the benefit of the following provisional applications, each of which is hereby incorporated by reference in its entirety: U.S. Provisional App. No. U.S. 60/984,948 filed Nov. 2, 2007; U.S. Provisional App. No. U.S. 61/060,226 filed Jun. 10, 2008; and U.S. Provisional App. No. U.S. 61/097,394 filed Sep. 16, 2008.

BACKGROUND

1. Field

The present invention is related to collective knowledge systems, and more specifically to providing natural language computer-based topical advice based on machine learning through user interaction.

2. Description of the Related Art

Online searching for topical advice represents a significant use of computer resources such as provided through the Internet. Computer users may currently employ a variety of search tools to search for advice on specific topics, but to do so may require expertise in the use of search engines, and may produce voluminous search results that take time to sift through, interpret, and compare. People may be accustomed to asking other people for advice in spoken natural language, and therefore it may be useful to have a computer-based advice tool that mimics more closely how people interact with each other. In addition, advice on topics may change in time, and any static database of advice may fall quickly out of date. Therefore, a need exists for improved topical advice search capabilities adapted for use with natural language, and that provides for continuous content refinement.

SUMMARY

The present invention may consist of a computing facility, such as a machine learning facility, that may ask a user questions, and based on the user's answers the system may offer a decision, such as a recommendation, a diagnosis, a conclusion, advice, and the like. Internally, the system may use machine learning to optimize which questions to ask and what decision to make at the end of the question 1320 and answer 1322 dialog. The system may learn through users providing feedback on the provided decision, including deciding whether the decision was helpful or not. Helpful decisions may become reinforced and become associated with the questions and answers that were asked along the way. When a user indicates that a decision was helpful, the system may remember which questions it asked, what the answer 1322 to each question was, and may associate these questions and answers with the ultimate decision. In embodiments, these associations may be the basis of the machine learning that may learn over time which question to ask the next time a user comes to the system.

In embodiments, the present invention may help a user make a decision through the use of a machine learning facility. The process may begin with an initial question being received by the machine learning facility from the user. The user may then be provided with a dialog consisting of questions from the machine learning facility and answers provided by the user. The machine learning facility may then provide a decision to the user based on the dialog and pertaining to the initial question, such as a recommendation, a diagnosis, a conclusion, advice, and the like. In embodiments, future questions and decisions provided by the machine learning facility may be improved through feedback provided by the user.

In embodiments, the initial question posed by the user may be an objective question, a subjective question, and the like. A question may be provided from amongst a broad category of topics, such as topics pertaining to a product, personal information, personal health, economic health, business, politics, education, entertainment, the environment, and the like. The question may be in the form of a multiple choice question, a yes-no question, a rating, a choice of images, a personal question, and the like. The question may be about the user, provided by another user, provided by an expert, and the like. The question may be based on a previous answer, such as from the current dialog with the user, from a stored previous dialog with the user, from a stored previous dialog with another user. The question may be a pseudo random question, such as a test question, an exploration question that helps select a pseudo random decision on the chance that the pseudo random decision turns out to be useful, and the like. The question may include at least one image as part of the question. The question may be along psychographic dimensions. In embodiments, the question may not be asked directly to the user, but rather determined from contextual information, such as through an IP address, the location of the user, the weather at the user's location, a domain name, related to path information, related to a recent download, related to a recent network access, related to a recent file access, and the like.

In embodiments, the dialog may continue until the machine learning facility develops a high confidence in a reduced set of decisions, such as a reduced set of decisions presented to the user, a single decision presented to the user. The decision provided by the machine learning facility may be independent of the order of questions in the dialog. The decision may provide an alternate decision when at least one question in the dialog is omitted, where the alternate decision may be different based on the machine learning facility having less information from the user. The decision may display a ranking of decision choices, such as ranking decisions across non-traditional feature dimensions. The decision may display at least one image related to the decision. The decision may be a pseudo random decision on the chance that the pseudo random decision turns out to be useful, such as the pseudo random decision being part of a system of exploration, where the system of exploration may improve the effectiveness of the system, the machine learning facility may learn from exploration, and the like.

In embodiments, the feedback provided may be related to, or derived from, how the user answers questions in the dialog, how the user responds to the decision provided by the machine learning facility, and the like. In embodiments, the feedback may be solicited from the user.

In embodiments, users may extend the learning of the machine learning facility by entering new information, where the new information may be their own topic, question, answer, decision, and the like. The machine learning facility may use the new information to determine whether the new information is helpful to users.

In embodiments, a user interface may be provided for user interaction with the machine learning facility, such as associated with a web interface, instant messaging, a voice interface, a cell phone, with SMS, and the like.

In embodiments, the present invention may help a user make a decision through the use of a machine learning facility. The process may begin with an initial question being received by the machine learning facility from the user, where the initial question may be associated with one of a broad category of topics, such as product, personal, health, business, political, educational, entertainment, environment, and the like. The user may then be provided with a dialog consisting of questions from the machine learning facility and answers provided by the user. The machine learning facility may then provide a decision to the user based on the dialog and pertaining to the initial question, such as a recommendation, a diagnosis, a conclusion, advice, and the like. In embodiments, future questions and decisions provided by the machine learning facility may be improved through feedback provided by the user.

In embodiments, the present invention may help a user make a decision through the use of a computing facility. The process may begin with an initial question being received by the computing facility from the user. The user may then be provided with a dialog consisting of questions from the computing facility and answers provided by the user. The computing facility may then provide a decision to the user based on an aggregated feedback from a plurality of users. In embodiments, the computer facility may improve future questions and decisions provided by the computing facility based on receiving feedback from the user.

In embodiments, the present invention may help a user make a decision through the use of a machine learning facility. The process may begin with an initial question being received by the machine learning facility from the user. The user may then be provided with a dialog consisting of questions from the machine learning facility and answers provided by the user, where the number of questions and answers provided through the dialog may determine the quality of the decision. The machine learning facility may then provide a decision to the user based on the dialog and pertaining to the initial question, such as a recommendation, a diagnosis, a conclusion, advice, and the like. In embodiments, future questions and decisions provided by the machine learning facility may be improved through feedback provided by the user. In embodiments, the quality may be high when the number of questions and answers large, such as greater than 10 questions, greater than 15 questions, greater than 10 questions, and the like. In embodiments, the quality may be good quality when the number of questions and answers is small, such as less than 10 questions, less than 5 questions, less than 3 questions, one question, and the like.

In embodiments, the present invention may make a decision through the use of a machine learning facility. The system may include a machine learning facility that may receive an initial question from the user, a dialog facility within the machine learning facility providing the user with questions and accepting answers from the user, the machine learning facility providing a decision to the user, and the like. In embodiments, the decision provided to the user may be based on the exchange between the user and the machine learning facility, and pertain to the initial question. Further, the machine learning facility may receive feedback from the user to improve future questions and decisions provided by the machine learning facility.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIGS. 8 and 8A depict an embodiment of a user's remembered answers.

FIG. 9 depicts choices that a user may contribute expertise.

FIGS. 11 and 11A depict an embodiment of an answer format.

FIG. 12 depicts an example list of all decisions in a topic.

Figure 1:
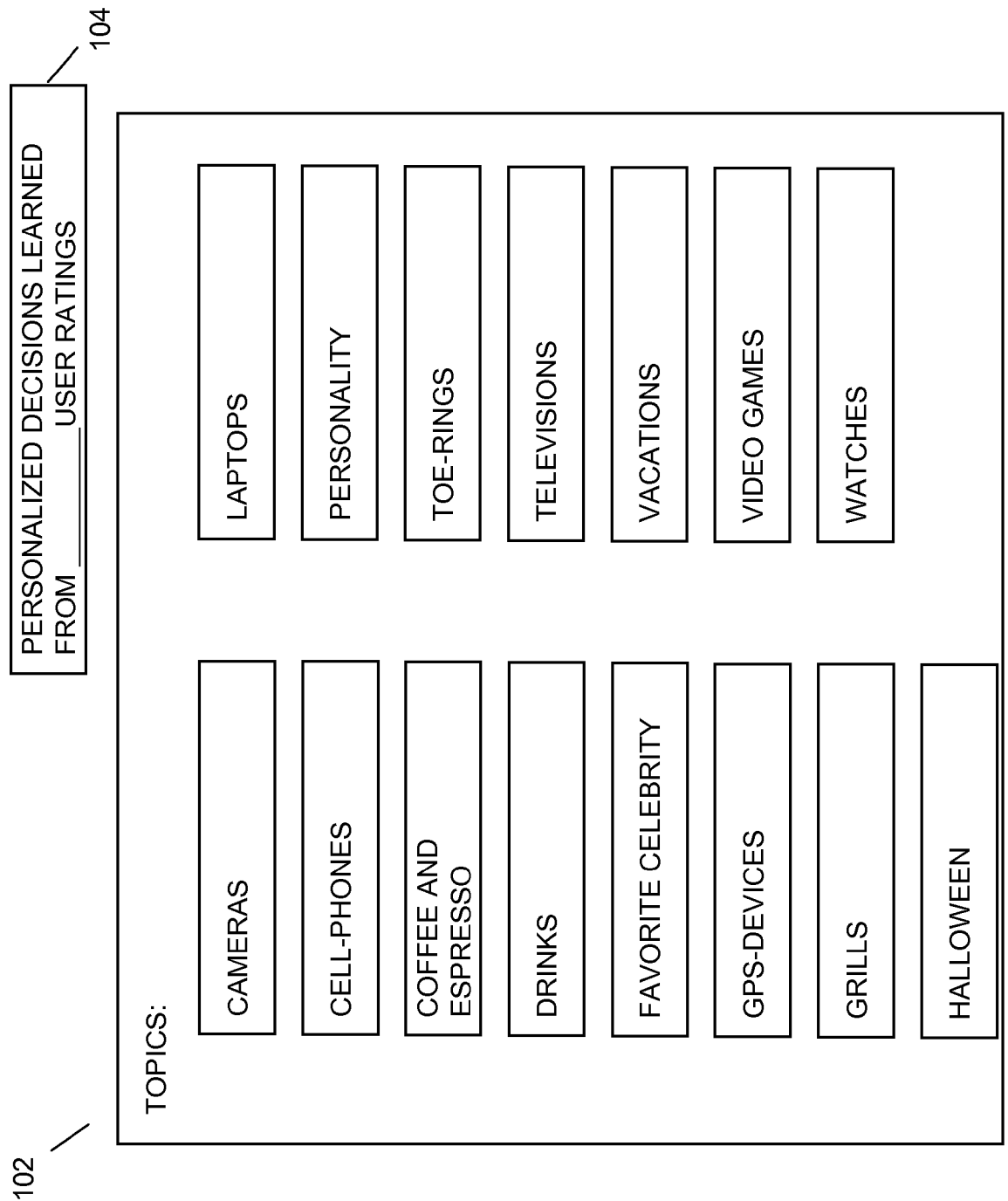
FIG. 1 depicts a list of topics in the system from which users may get decisions.

While the invention has been described in connection with certain preferred embodiments, other embodiments would be understood by one of ordinary skill in the art and are encompassed herein.

All documents referenced herein are hereby incorporated by reference.

DETAILED DESCRIPTION

The present invention may ask the user 1314 questions 1320 and based on the user's answers the system may offer a decision, such as a recommendation, a diagnosis, a conclusion, advice, and the like. Internally, the system may use machine learning to optimize which questions 1320 to ask and what decision 1310 to make at the end of the process. The system may learn through users giving feedback on the ultimate decision, whether the decision 1310 was helpful or not. Helpful solutions may get reinforced and associated with the questions 1320 and answers 1322 that were asked along the way. When a user 1314 says that a decision 1310 was helpful the system may remember which questions 1320 it asked, what the answer 1322 to each question 1320 was, and may associate these questions 1320 and answers 1322 with the ultimate decision. These associations may be the basis of the machine learning that learns over time which question 1320 to ask the next time a user 1314 comes to the system.

For example a user 1314 may try to get advice picking a bar to visit. The system may ask the question "How old are you?" and get the answer "in my 30s". Ultimately, the system may show the user 1314 the decision "Kelley's Irish Bar". Assume the user 1314 says this decision was helpful. The system will increase the association between the question "How old are you?", the answer "in my 30s" and the decision "Kelley's Irish Bar". The next time a user 1314 comes to the site looking for advice on a bar, the system will be more likely to ask the user 1314 the "How old are you?" question 1320 since in the past this question 1320 was useful in helping the user. If the user 1314 answers the question 1320 in the same way as the prior user 1314 (saying "in my 30s") then the system will increase its belief that the ultimate decision is "Kelley's Irish Pub".

Users may also enter new questions, answers, and ultimate decisions. The system may then try out the new questions 1320 with future users to see if the questions 1320 turn out to be useful in helping those users. For example, a user 1314 of the bar recommendation service may contribute the question "Do you want a loud place or a quiet intimate setting?". The system may decide to ask this question 1320 in a future use of the bar recommendation service and through the process outlined above observe a correlation between the answers of this question 1320 and recommendations that users find useful. On the other hand, a user 1314 may contribute a question 1320 that has no value in helping users. For example, a user 1314 could contribute the question "Do you have a Canon camera?". The system may try this question 1320 out on future users and fail to notice any correlation between the answers to this question 1320 and bar recommendations that users find helpful. In this case, the question 1320 may get asked less since it's not predictive of whether one recommendation or another recommendation is helpful.

The system may keep asking questions 1320 until it feels it has a high confidence in a few possible decisions. The system may also stop sooner if it feels like it has already asked too many questions 1320 and risks annoying the user. The system may also ask at least a minimum number of questions 1320 to avoid the user 1314 feeling that the system couldn't possibly have asked enough to make an intelligent decision.

The system may have a mechanism to tolerate incorrect answers from the user. Incorrect answers may result from the user 1314 not understanding the question, not understanding the answer 1322 or not knowing the answer 1322 to the question. If the bulk of the answers given by the user 1314 support a particular decision, the system may make that decision 1310 even though not all the user's answers support that decision.

In embodiments, the present invention may provide for at least one of questions 1320 and answers 1322 between the system and the user, decisions to users, and machine learning utilized to improve decisions. The system may provide for an improved way to generate questions 1320 and answers 1322, an improved way to provide decisions to users, an improved way to utilize machine learning to improve questions 1320 and decisions provided by a system, and the like, where any of these capabilities may be separately, or in combination, used as a standalone system or incorporated into a third party system as an improved capability. In embodiments, each of these improved capabilities may utilize some form of machine learning as described herein. For example, the system may provide for an improved way to execute a question 1320 and answer 1322 session with a user 1314 by learning under what circumstances the user 1314 is looking for certain information. For instance, it may be learned by the system that the weather is a condition under which users have a differentiated preference depending on the time of day and the weather conditions. When it's raining during the day, and a user 1314 searches for movies, the user 1314 may be more likely to be looking for movie tickets and locations where the movie is playing. When it's raining during the night, and the user 1314 searches for movies, the user 1314 may be more likely to be looking for a description of the movie. In another example, the system may provide for an improved way to provide decisions to users, such as learning that users prefer certain formats during the daytime versus during the evening, providing choices verses a single decision 1310 based on age, prefer a greater number of questions 1320 prior to presentation of the decision 1310 based on the user's geographic location, and the like. In another example, the system may provide for an improved way to learn what decision 1310 to choose for a user, such as utilizing greater expert information based on age and education, utilizing popular opinion more when the topic is fashion and the user 1314 is young versus utilizing traditional practice more when the user 1314 is older, asking more questions 1320 about the user's choices in friends when the topic is personal, and the like.

In embodiments, the present invention may provide for combinations of question 1320 and answer, providing decisions, and learning what decisions to provide, where one of the elements may not be provided by the system, such as when that element is provided by a third party system. For example, a third party search engine web application may what to improve their capabilities for providing sorted lists from a user's search query, and so may want to utilize the present invention's facility for generating questions 1320 and answers 1322 to augment their keyword search and sort algorithms. In this instance, the third party search engine provider may not be interested in the present invention's facility for generating decisions, because their service is in the business of providing sorted lists, not a limited set of decisions. However, the present invention may provide an important new capability to the search engine provider, in that the present invention's ability to constantly improve the questions 1320 and answers 1322 to users may enable the search engine provider to improve their sorting result to users based on the present invention's capabilities.

In embodiments, the present invention may provide other combinations of some subset of asking questions, making decisions, and learning to make better decisions, such as using the present invention's facilities for making better decisions, but only using input from experts; not providing a question 1320 and answer 1322 session for a particular user, but rather utilize previous user 1314 interactions with the system to provide decisions; asking questions 1320 and answers 1322 to a user 1314 to allow the system to learn in association with future decisions, but providing rewards to the user 1314 rather than decisions; asking question 1320 and answers and making a decision 1310 without any learning, such as simply filtering down results; utilizing the present invention's ability to learn how to make a better decision, but providing that capability to an expert system rather than to users through a question 1320 and answer 1322 interface; and the like. In embodiments, the system may provide for all the elements of a question 1320 and answer 1322 user 1314 session, providing decisions to the user, and learning how to improve decisions.

In embodiments, the present invention may provide for a system with a user 1314 interface through which the user 1314 may interact with the facilities of the system. The system may include several parts, some of which may be the website, the supervisor, and a collection of widgets. Widgets may be collections of code that collect, process, and render a single piece of content on the website. The website may consist of interfaces for end-users, staff members, and registered users to get decisions, edit the decisions, and view reports on system performance. The supervisor may be a container for running widgets so that a widget can perform time-consuming data collection and processing ahead of user 1314 requests to render that content.

For example, a widget might collect videos about decisions from the internet. The widget, in the supervisor, might crawl the web looking for videos about each decision 1310 and store videos it finds in a database. When the user 1314 comes to the website and gets a particular decision, the website may ask the video widget to render itself and display any videos it has previously found.

A plurality of instances of the supervisor may be running on multiple computers in order to scale up the widget's processing. Each widget may be running on its own computer.

Similarly, many computers may be providing interfaces to the system through web-servers, instant messaging, voice gateways, email, programmatic APIs, via being embedded in third party websites, and the like.

In embodiments, attributes may be combinations of a question 1320 and one particular answer 1322 to that question. For example, if a question 1320 was "How old are you?" and the answers to that question 1320 were "under 18", "20-30" and "over 30", then an attribute would be "How old are you? Under 18". The system may work by learning the relationship between attributes and decisions. When the system asks a question 1320 and the user 1314 gives an answer 1322 then the system may take that attribute and see which decisions are associated with it.

In embodiments, the system may understand that some attributes represent continuous values while others represent discrete values. When using continuous attributes, the system may be able to make more intelligent tradeoffs such as understanding that it is frequently acceptable to recommend a product that costs less than the user 1314 asked for but rarely acceptable to offer a product that costs more than the user 1314 asked for.

In embodiments, the relationships between attributes and decisions may be learned from users, explicitly given to the system or some combination of the two, and the like. For example, a price attribute of "How much do you want to spend? Under $200" might be explicitly linked to cameras that fall into that price range based on data from experts, ecommerce sites/APIs, etc. The relationship between the attribute "How will you use the camera? On vacations" and possible vacation destinations might be fully learned however.

In general, the relationships learned may involve training from users, experts, employees, automated data feeds from third parties, or some combination.

In embodiments, there may be various ways that the system can recommend a solution and select the next question 1320 to ask the user. Possible machine learning systems may be geometric systems like nearest neighbors and support vector machines, probabilistic systems, evolutionary systems like genetic algorithms, decision trees, neural networks, associated with decision trees, Bayesian inference, random forests, boosting, logistic regression, faceted navigation, query refinement, query expansion, and the like. These systems may be based around learning from complete game plays (e.g., all attributes given by a user 1314 before getting a decision), the answers to individual questions/subsets of game plays, only positive feedbacks, only negative feedbacks or some combination of the two. Additionally, the system may take into account previous interactions the user 1314 had such as remembering previously answered questions, decisions that the user 1314 liked or did not like, etc. Additionally, the system may take into account factors that are implicitly provided by the user 1314 such as time of day and date the user 1314 used the system, the user's IP address, client type (e.g., Firefox, IE, cell phone, SMS, and the like), and other such data.

In embodiments, the present invention may provide for a machine learning system that goes well beyond the capabilities of collaborative filtering, such as through explicitly asking questions 1320 instead of implicitly learning based on a user's behavior, which may be much more powerful since the system is not left trying to infer the user's intent, mood, etc. Also, choosing the questions 1320 to ask the user 1314 based on what they've already answered may allow the present invention to zero in on nuances that would otherwise be missed. The present invention may have the ability to explain decisions, such as providing decisions beyond simple extrapolations form past behavior such as in, 'other people who bought X, Y and Z also liked product A'. Instead, the present invention may be able to say the user 1314 should 'do A because the user 1314 said they wanted X, liked Y and believed Z'. In addition, the present invention may allow users to contribute new questions 1320 that may be useful, and then automatically learn under which contexts, if any, the question 1320 is helpful. In another area of difference, the present invention's machine learning technology may be able to provide decisions in a great variety of user 1314 interest areas, where collaborative filtering has difficulties being applied to non-product/media applications. For instance, collaborative filtering would not be easily applied to helping a user 1314 make a decision 1310 on a highly personal topic, such as whether they should get a tattoo, or a rare question 1320 such as whether a particular expense can be deducted on the user's tax return. The present invention may be capable of such applications. In embodiments, the present invention may be able to use pre-programmed expert advice inter-mixed with advice learned from a group of users to make decisions to users.

In embodiments, the system may have a wiki web interface for editing all of the data on the system. The web interface may be used to edit/create/delete questions, answers, attributes, and solutions. Each solution may also have a variety of information associated with it, which may be shown on the decision page when that solution is recommended. For example, when recommending a vacation in Cancun the recommendation page might show videos about Cancun. All of this ancillary data about the solution may also be editable through the wiki.

In embodiments, the wiki may be used to edit data collected by widgets running in the supervisor. This may allow the widgets to collect data ahead of time and then have a human quality assurance process to review and change the collected data.

In embodiments, the system may maintain a history of all changes made by either the widgets or humans. For example, one use of this history may be to review the work done by hired contractors doing content quality assurance. Another use of this history may be making sure that the widgets do not undo work done by humans. For example, if the widgets collect a particular video and a human deletes that video because it is inappropriate, then the widget can use the history to not re-add that video again sometime in the future. Finally, if data is corrupted or incorrectly deleted the history may allow a means of recovery.

In embodiments, when widgets find new content they may queue tasks to a human workflow for validating and editing that content.

In embodiments, in order to learn, the system may sometimes make random or semi-random decisions in hopes of recommending something that the system wouldn't have expected to be useful, but which may turn out to be useful. If the system wants to use what it has already learned, then it may not make random choices in which questions 1320 it asks and which decision 1310 it makes. There may be a tradeoff between using what is already known, also referred to as exploitation, and potentially learning something new, also referred to as exploration. Exploitation may lead to a more satisfied user, while exploration may make the system smarter.

In embodiments, one way to make this trade-off when selecting questions 1320 to ask the user 1314 may be to ask questions 1320 that the system is confident are useful in making a decision 1310 and then picking a few random questions 1320 to ask. Another way to make the trade-off may be to have a fixed budget in every user 1314 interaction where a fixed set of questions 1320 are based on exploitation and the next set are based on exploration.

In embodiments, decisions may also be explored or exploited. If the system wants to learn, it may show a random decision. Instead of showing a purely random decision, the system may also show a decision 1310 that meets some requirements specified by the user 1314 and is purely exploring within the remaining requirements. For example, instead of picking a random camera to show the user 1314 the system could pick a random camera that meets the user's price requirements. This may result in more efficient training since the system may be less likely to show a decision 1310 that has no chance of meeting the user's needs. Rather than showing a random decision 1310 when exploring, the system may also show both the exploited decision 1310 and an explored solution and get feedback on each separately from the user. Alternatively, the system could inject a limited amount of randomness and pick a decision "like" what the system's best guess is. For example, the system may predict that the user 1314 will like one particular camera but could instead recommend another similar but not identical camera in order to balance making a reasonable decision 1310 and still learning new information from the user. In embodiments, the system may identify to the user 1314 when it is asking questions 1320 or making decisions through exploration vs. exploitation, or it may not.

In embodiments, the system may be viewed as surveying users about the various things it is recommending. For example, the system may ask the user 10 questions 1320 about the Canon SD1000 camera. This may provide a rich set of data about each camera allowing the system to start building lists of what kind of user 1314 is likely to like this camera. The system may build a ranked list of decisions for each attribute, such as from most likely to be liked to least likely to be liked, given that attribute. For example, the system may build a list of cameras in order likely to be liked by people who say "How old are you? Over 50". This may be shown by the system as the top 10 cameras for users over 50. Numerous of these top 10 lists may be constructed based on the system's data. These lists may also be combined to form new lists. For example, given the ranked lists of cameras for the attribute "How old are you? Over 50" and another list for the attribute "Why are you buying a camera? Travel", the system may construct a new ranked list of cameras for the "Over 50 year old users who want a travel camera". These combinations of top lists may be pre-generated, generated on-demand by incrementally asking the user 1314 to select new top lists, and the like.

In embodiments, these "top lists" may be used for a variety of purposes. Some users may not want to answer a series of questions 1320 before receiving a decision. Instead, they may be able to browse through these lists and find a relevant decision. The system may have a large number of top lists, such as thousands or tens of thousands, each of which may have their own web page. In addition, these pages may contain a large amount of content that may be indexed by search engines and bring users to the system's website.

In embodiments, various pages on the site may have self-contained displays of information called widgets. For example, the decision pages may have a widget that shows how other people who liked this question 1320 answered various questions, videos/pictures about the decision, links to other web sites that have information about the decision, personalized pros and cons of this decision 1310 based on how the user 1314 answered questions, lists of other decisions that a similar, lists of other decisions that would have been made had questions 1320 been answered differently, lists of awards/honors for this decision (such as Consume Reports recommended), and the like.

In embodiments, the system may allow users to navigate through the universe of decisions (e.g., cameras, vacation destinations, etc) along dimensions that are not commonly available. For example, instead of being shown a camera and only letting the user 1314 say "show me more/less expensive cameras" the system may let the user 1314 say "show me cameras that are more liked by young people", "show me a camera that is better for travel and less stylish", and the like. Dimensions like "style", "good for travel", "bad for young people", and the like, may be generated as a side-effect by asking users questions 1320 and then learning what is a good decision 1310 given those answers.

In embodiments, another possible interface may be to show users a list of decisions and display a simple explanation for why each decision 1310 is being made. For example, when recommending cameras the system may show three cameras and say that one is "cheaper", one has "longer zoom" and the other is "better for travel". This may help the user 1314 see alternatives that they may not have otherwise seen based on how they answered the questions 1320 leading up to the decision 1310.

In embodiments, users may be asked different types of questions, such as questions 1320 about the item being recommended (price, color, etc), questions 1320 about themselves, and the like. The system may differentiate users along dimensions, such as psychographic dimensions, demographic dimensions, and the like. Properties of users that may be predictive may include the user's age, sex, marital status, whether they live in rural/urban areas, frequencies of church attendance, political affiliation, aesthetic preferences, sense of irony/sense of humor, socio-economic background, taste, preference for neat or disorganized lifestyle, degree to which they plan ahead of time, and the like.

In embodiments, it may be difficult to directly ask questions 1320 and instead the system may try to measure things that are correlated instead. For example, instead of asking about income, the system might ask where the user 1314 prefers to shop (e.g., Wal-Mart, Target, Saks, etc). Aesthetics may be determined via showing pictures of art, living rooms, clothes, and the like, and asking which style the user 1314 prefers. In embodiments, pictures may take the place of the question (and the answers may be about how you react to the picture) or the picture can take the place of answers to questions 1320 such as "Which of the following best resembles the clothes you like to wear".

In embodiments, the system may group questions 1320 by whether they are about the item being recommended or about the user. The system may explain what type of questions 1320 it is asking in order to help the user 1314 understand the value of otherwise surprising and potentially offensive questions 1320 being asked. The system may also display other types of messages to the user 1314 while asking questions, such as telling the user 1314 how many questions 1320 remain, taunting the user 1314 by saying the system can already guess what decision 1310 to make, and the like.

In embodiments, instant messenger (IM) systems may provide a natural interface to the question 1320 and answer 1322 dialog of the system. For example, a user 1314 may invite our system to their "buddy list" and then initiate a dialog to get a decision 1310 over IM. The system may IM the first question 1320 to the user, the user 1314 may then IM their answer 1322 back, and the like, until eventually the system IM'ed the user 1314 a link to the decision, or directly IMed the name of the decision 1310 to the user. In embodiments, other forms of communications may also be used, such as cell phones, SMS, email, and the like.

In embodiments, the system, such as in the form of an application, may be embedded in third party web sites. For example, the system could be put on a website that sells cameras and offer to recommend relevant cameras to the user. Alternatively, after the user 1314 searched for cameras and had a list of potential cameras they were interested in, the system could ask questions 1320 to help the user 1314 decide amongst the list of cameras. For example, if all of the cameras that the user 1314 was considering were good for travel the system would not ask about how the user 1314 wanted to use the camera, but the system might realize that asking whether interchangeable lenses were desired could be used to recommend one camera over another.

In embodiments, the system may make decisions in a plurality of topic areas, such as: products (e.g., cameras, TVs, GPS/navigation, home audio, laptops, bath & beauty, baby, garden/outdoor, automobiles, jewelry, watches, apparel, shoes, and the like), travel (e.g., where to go, where to stay, what region to visit, what to do there, and the like), financial (e.g., which mortgage, whether to refinance, which credit card, whether something is deductible on taxes, what type of IRA to save in, asset allocation for investments, and the like), gifts for various holidays and occasions, other date-based decisions (what to dress up for Halloween, and the like), personality (e.g., about a user's personality, about their relationships, their career, and the like), recommending the right pet, drinks and other aspects of night-life, books, movies, film, /music, concerts, TV shows, video games, where to eat, what to order, celebrity related such as which celebrity the user 1314 is most similar to, recommending a gift, what neighborhood to live in, what to watch on television, and the like.

In embodiments, the system may be used to diagnose problems, such as in the areas of technology/IT (e.g., computer, software, printers, home networking, wireless, business networks, performance issues, and the like), medical/health, automotive, relationship or interpersonal problems, home and building problems, and the like.

In embodiments, users of the system may be either anonymous or logged in users. A logged in user 1314 may be one that has created an account on the site. Logged in users may also have profile pages about them. Content on the profile page may include basic information about that user (nickname, picture, etc), decisions they have received and liked, decisions the system predicts the user 1314 will like even though the user 1314 has not answered questions 1320 in that topic area, lists of facts about the user 1314 that the user 1314 has given so that they do not need to be repeated each time the user 1314 uses the system for a decision (e.g., the user's age or their aesthetic preferences can be given once and remembered across different times the user uses the system), lists of tasks that the system thinks the user 1314 may be qualified and interested in doing via the wiki (such as reviewing new user 1314 submitted content, fixing spelling errors in user 1314 submitted content, reviewing new content found by the widgets, etc), other users with similar answers to questions, and the like.

In embodiments, users may also have various titles, ranks or levels which may affect what they can do on the system. For example, some users may be given the title of "moderator" in a particular topic which would allow those users to edit certain aspects of those topics. The ranks and titles may be assigned manually or by through automatic means including being based on how many decisions they have given, how many new questions 1320 or solutions they have contributed to the system, how many tasks they have accomplished using the wiki, how well they answer 1322 certain questions 1320 in the various topics, and the like.

In embodiments, the system may learn from users submitting feedback on decisions. Some users may either intentionally or unintentionally give incorrect feedback. For example, a vendor may try to game the system to make their product be highly recommended. Alternatively, a user 1314 who does not know much about video games may recommend a video game that in reality is not a good video game. The system may try to filter out feedback from these users by a variety of means. The system may throttle the number of feedbacks that a given user 1314 can submit (and have a higher throttle limit if the user 1314 is logged in or has a high rank/title). The system may also throttle or weight feedback based on how well the user 1314 answers certain 'test' questions 1320 during the question 1320 & answer 1322 phase in order to test the user's knowledge of the subject and weigh feedback from knowledgeable users more than unknowledgeable users. The system may also require the user 1314 to pass a 'captcha' (Completely Automated Public Turing test to tell Computers and Humans Apart) before their feedback is counted or they get a decision. The system may also look at the series of answers given by the user 1314 and weight the user's feedback based on that series of answers. For example, if the user 1314 either always clicked the first answer 1322 or the user 1314 clicked in a very improbable way, then the system may weight that user's feedback lower. Finally, the system may change the weight of the user's feedback or decide to not show a decision 1310 based on the history of previous game plays. For example, the 10th time a user 1314 tries to get a camera decision 1310 the system may weight their feedback less than on the 9th time.

In embodiments, the system may include search engine optimization (SEO), the process of improving the system's website rankings within major search engines. This process may be broken down into several mostly-automated steps, such as discovering the keywords that users are searching for, understanding the competition in the search engines to have the site's page come up when users search for these words, understanding how search engines rank sites, understanding what changes to the system's website need to be made in order to increase the site's ranking for common searches, and the like.

In embodiments, discovering keywords that users may be searching for may be found through different means, such as using keyword suggestion tools such as what Google and Yahoo provide, using data about historical searches licensed from third party data providers and crawling other websites to see what words they use, and the like. Once these keywords are found, the system may use the data in many ways, such as bidding on those words via search engine marketing (SEM), developing content on the system's site about those keywords in hopes of getting search traffic in the future, looking at how our competitors are using those same keywords, and the like.

In embodiments, the system may understand what other sites are doing and how they rank in the search engines by running keywords through the search engines and looking at who is advertising on each keyword and what the top natural search results are for each keyword. The sites discovered through this process may be crawled to discover more potential keywords. The system may also decide to develop new content or avoid a market based on this competitive information. If there are few highly ranked sites in a content area, the system may develop content in that area.

In embodiments, the system may understand how search engines rank their natural (non-sponsored) search results by studying the relationship between sites that come up when a search is done and factors of those sites. Possible factors that may be correlated between sites that come up with high ranking may be factors such as the content of the site, number and quality of other sites linking to the site, the type of content on those other linking sites, and the like. From the prior step, the system may generate a list of site factors, ranked by their ability to increase a sites ranking in the search engines, and the like. The system may then use this ranked list to make changes to the site to increase the probability that the site as a whole, or certain pages on the site, will be highly ranked in the search engines.

Search engines may typically utilize a keyword index to find documents relevant to a user's query. In embodiments, the present invention may utilize a "decision index", which may also map user-input to relevant documents. The index may be built automatically, experts may hand build the index, the index may be learned through feedback from different types of users who implicitly or explicitly decide to train the system, and the like. The results of the search utilizing the decision index, may be displayed as a list of documents, a single document, and the like.

Referring to FIG. 1, an embodiment for a list of topics 102 in the system from which users may get decisions is presented, including cameras, cell phones, coffee and espresso, drinks, favorite celebrity, GPS devices, grills, Halloween, laptops, personality, toe rings, TVs, vacations, video games, watches, and the like. In addition, there may be an indicator as to the number of decisions learned 104 from user ratings, such as learned from 43,921 user ratings.

Figure 2:
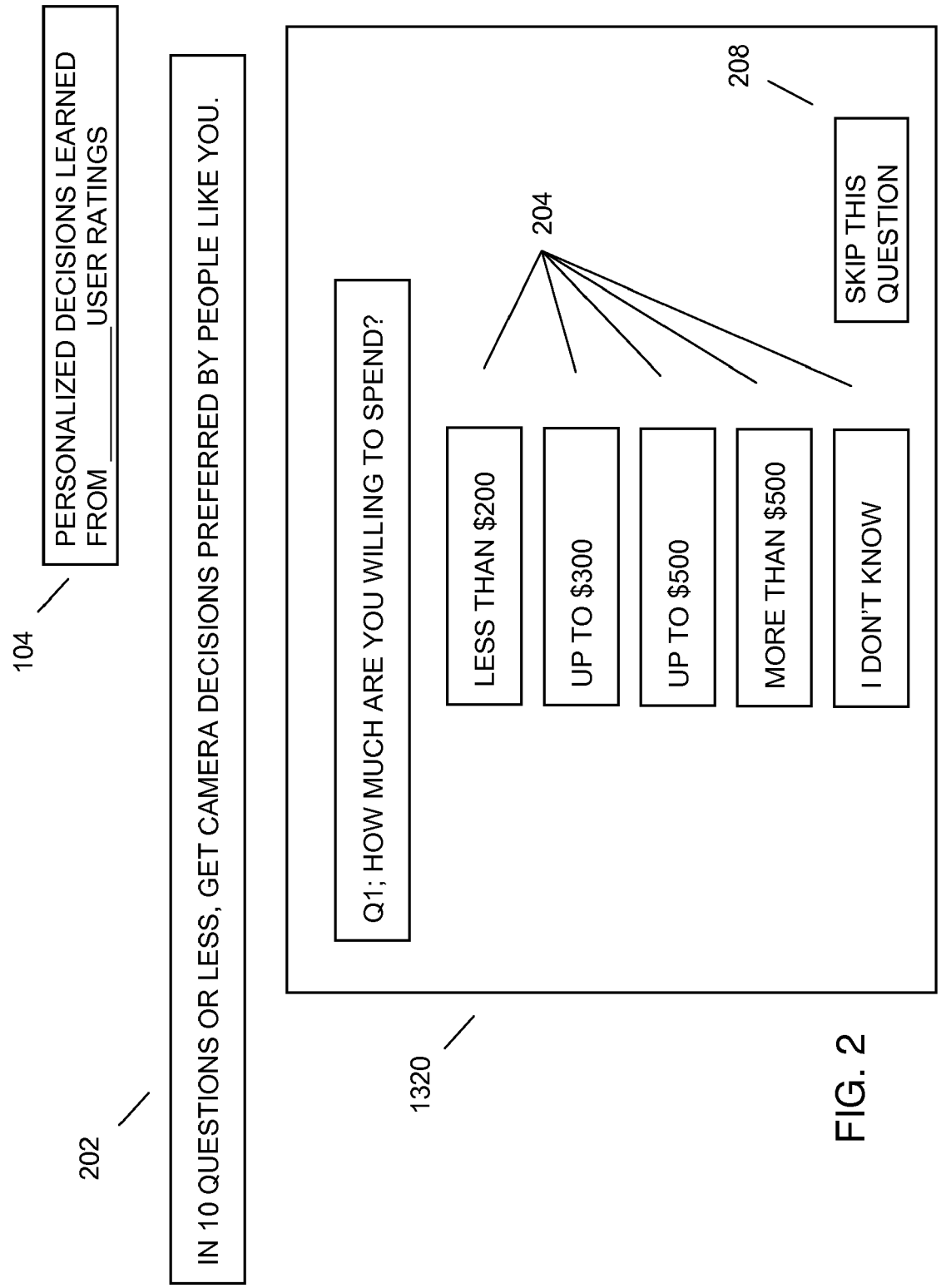
FIG. 2 depicts an example question that the system may ask a user.

Referring to FIG. 2, an embodiment of an example question 1320 that the system may ask a user 1314 is provided. In this example the user 1314 is asking for a decision 1310 related to the purchase of a camera, and the question 1320 is "How much are you willing to spend?" The user 1314 may now choose from the selection 204, such as to select between less than $200, up to $300, up to $500, more than $500, I don't know, and the like. In addition, there may be an indication as to how many questions 1320 may be asked 202, such as in "In 10 questions or less, get camera decisions preferred by people like you." In embodiments, the user may also offer their own question, their own answer, their own decision, and the like, where the system may utilize this information in the current or future decision session. In embodiments, the user 1314 may choose to skip the question 208, where the user 1314 may now be provided an alternate decision based on a reduced amount of information available from the user, the system may ask the user alternate questions 1320 to make up for the skipped question 208, the question 1320 may have been a test question and will not affect the resulting decision 1310, and the like.

Figure 3:
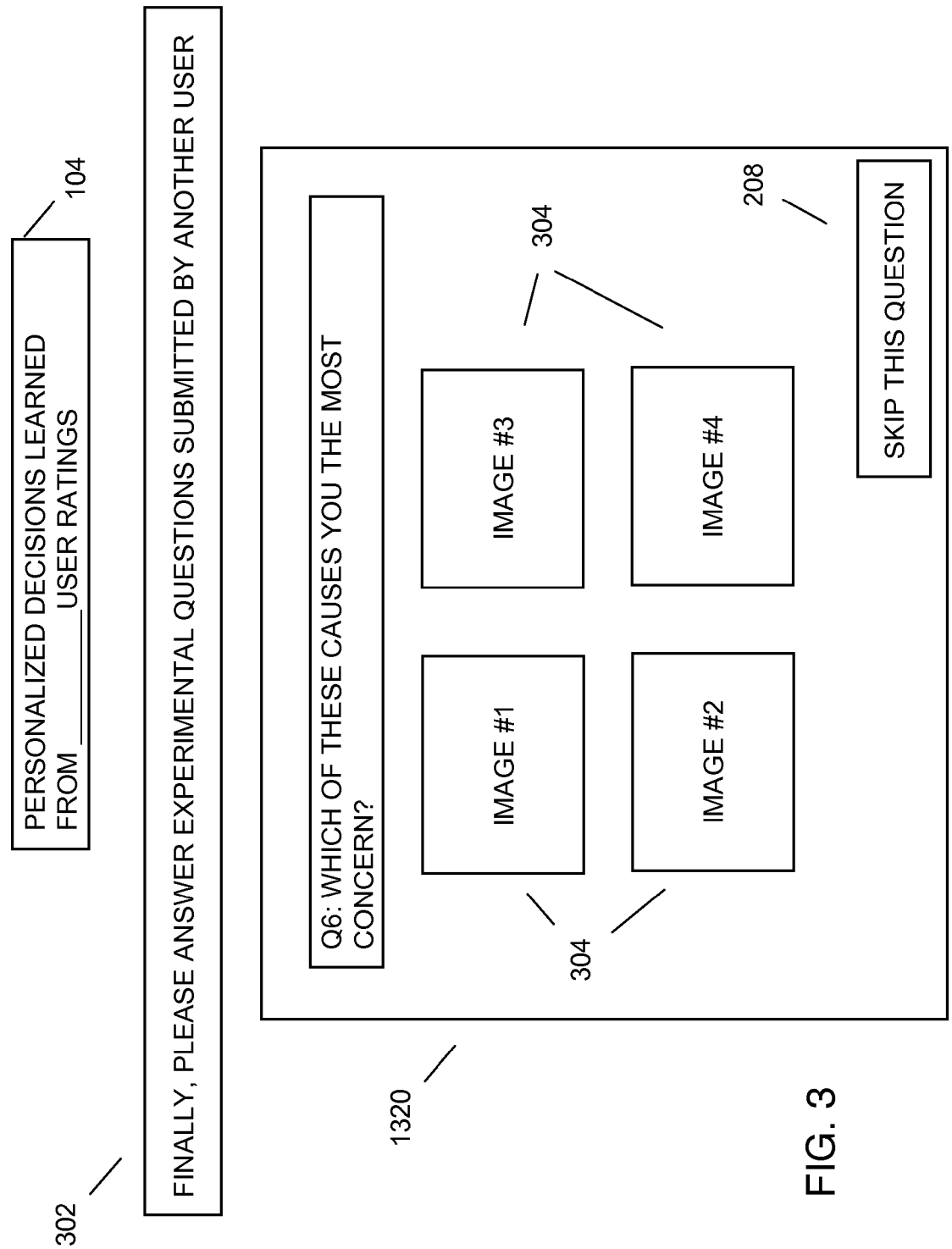
FIG. 3 depicts an example picture question that the system may ask a user.

Referring to FIG. 3, an embodiment of an example picture question 1320 that the system may ask a user 1314. In this example, the system may be asking a question 1320 whose answer 1322 may better enable the system to determine a personal characteristic of the user 1314. For instance, the question 1320 as illustrated asks "Which of these causes you the most concern?", where the picture choices 304 are indicative of certain topics, such as pollution, finances, national defense, health, and the like. This question 1320 may be targeted to the current user or be inserted as an experimental question. In embodiments, the user 1314 may be informed that the question 1320 is an experimental question 302, such as shown in FIG. 3 with the header that reads, "Finally, please answer the experimental questions submitted by another user."

Figure 4:
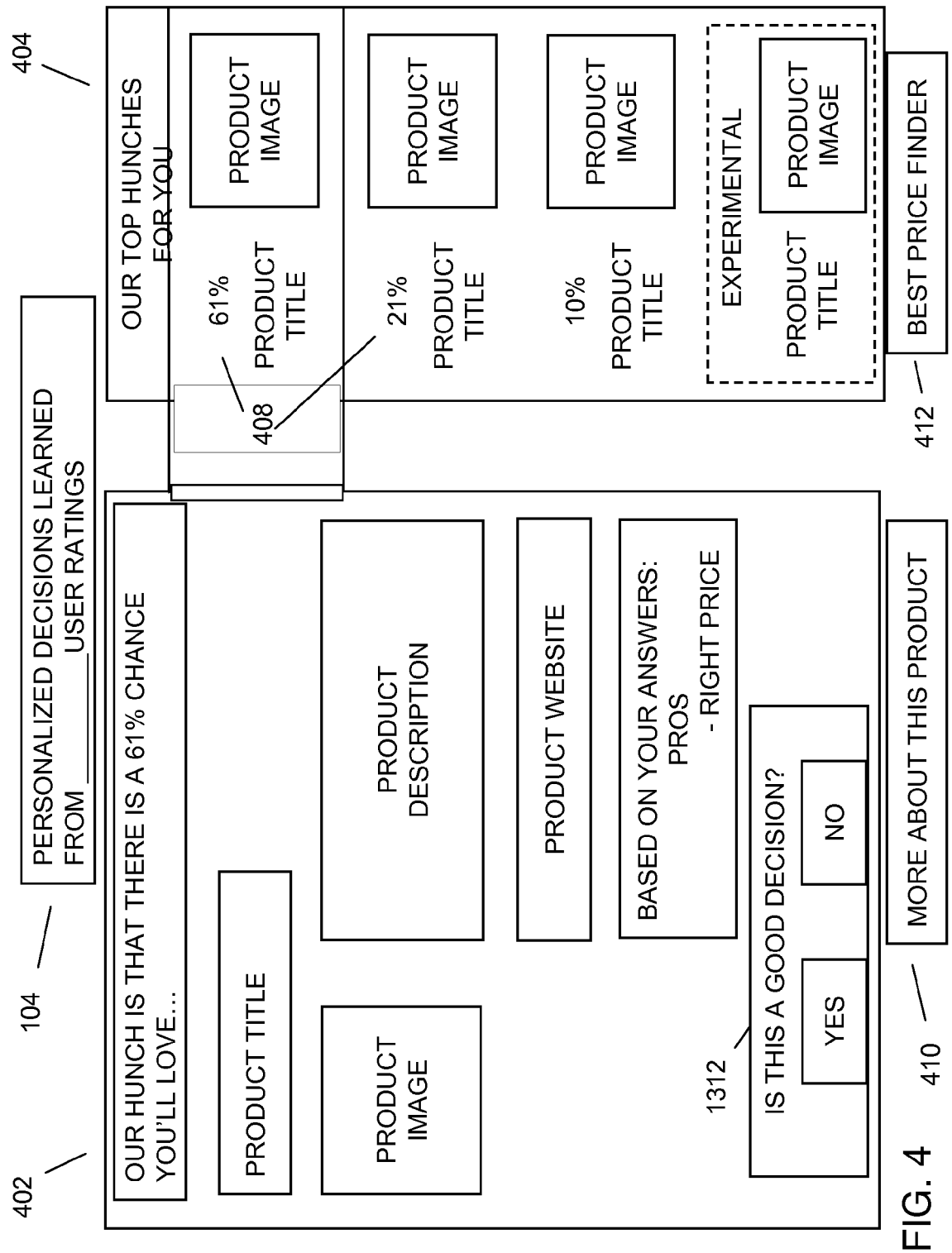
FIG. 4 depicts an example of the type of information the system may show the user when making a particular decision.

Referring to FIG. 4, an embodiment of an example of the type of information 402 the system may show the user 1314 when making a particular decision 1310 is presented. For example, the decision 1310 may be for a certain camera, where information is provided about the camera, such as a description, who uses it, the best cost for the camera, how it compares 404 to other cameras, and the like. In embodiments, other decisions 1310 may be provided, such as with a relative ranking 408, by a score, by a percentage matching, and the like. The user 1314 may also be queried for feedback 1312, such as being asked if the decision 1310 is a good decision. In addition, the user 1314 may be provided with the opportunity to find out more about the decision 1310, such as more about the product 410, best price finder 412, websites to more advice, and the like.

Figure 5:
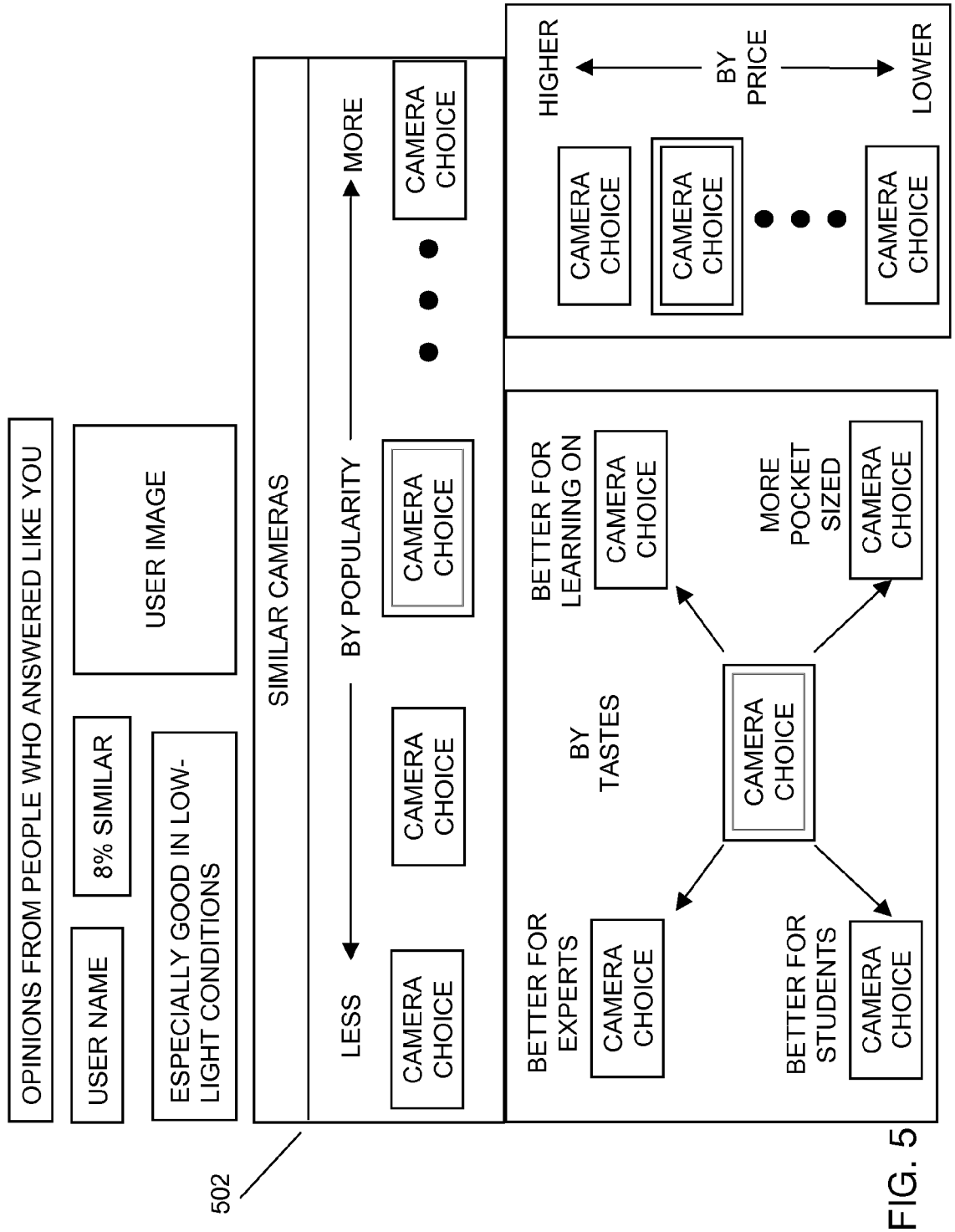
FIG. 5 depicts an example of top lists for cameras.
Figure 6:
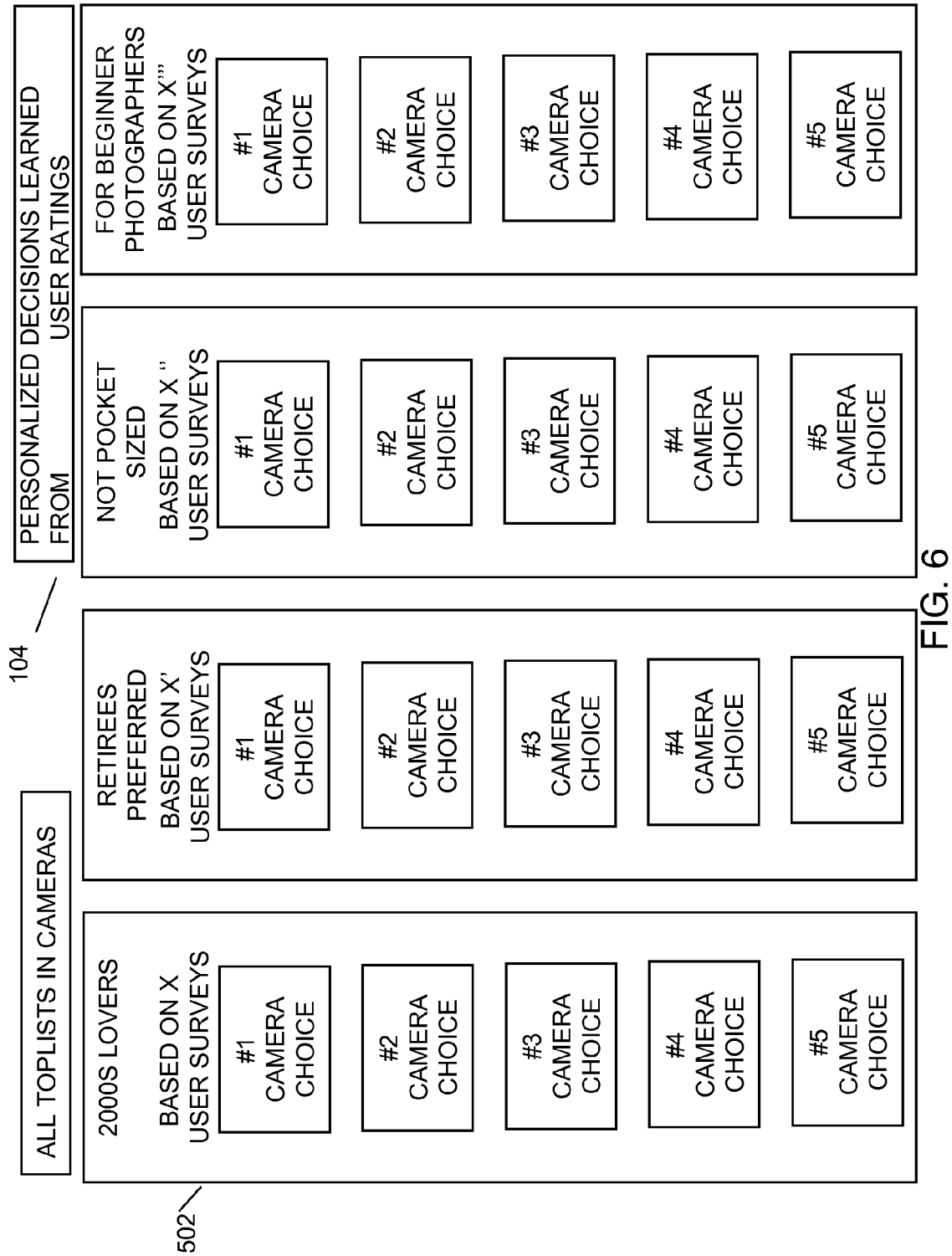
FIG. 6 depicts a second example of a top list for cameras.

Referring to FIG. 5 and FIG. 6, the user 1314 may be provided with various top lists 502 associated with a topic as described herein, such as presented in association with a decision, in association with a user's request to view top lists, and the like.

Figure 7:
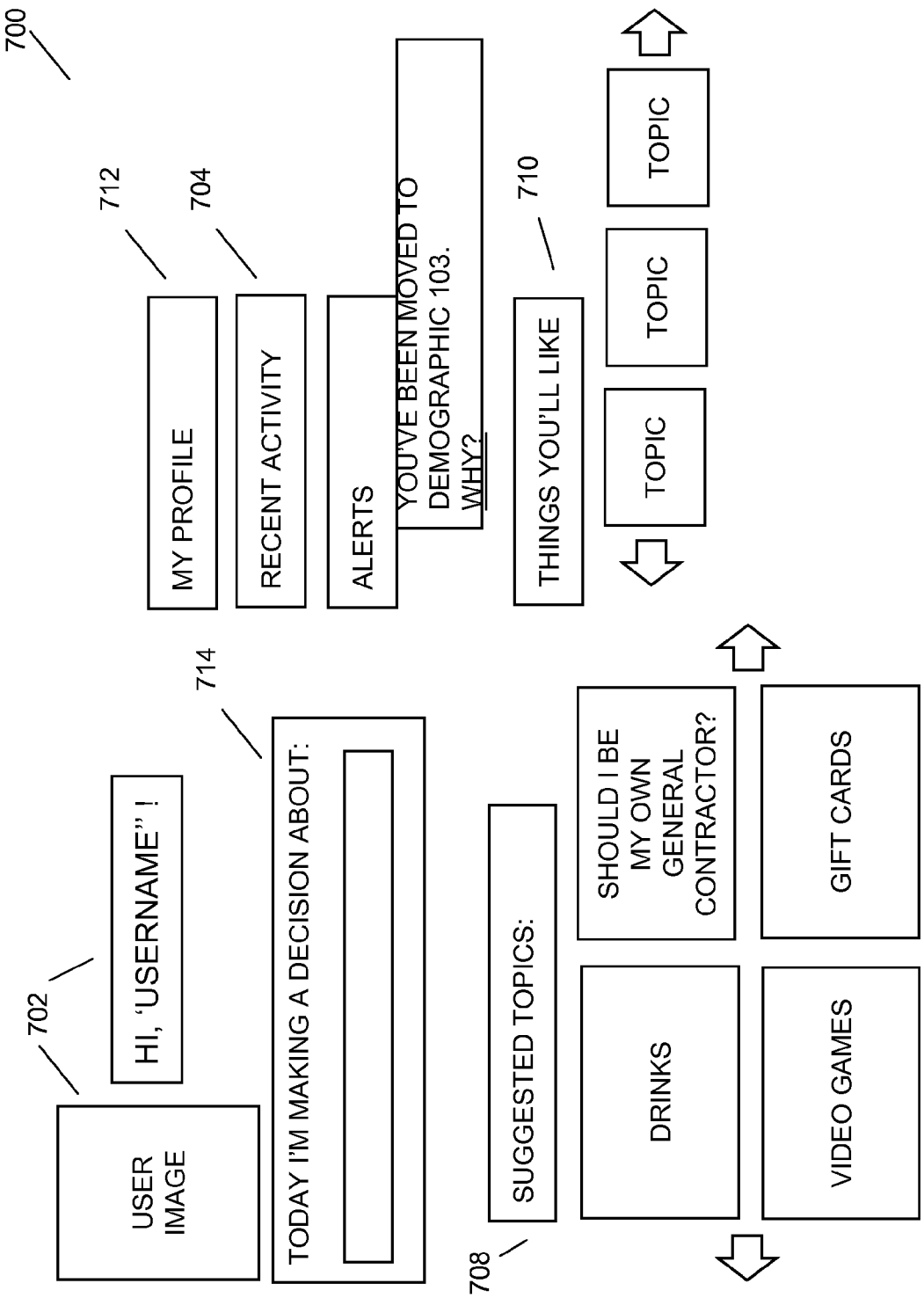
FIG. 7 depicts an embodiment of a user home page.

In embodiments, the present invention may provide users with a home page 700 including user 1314 identification 702, personal representation, past decisions made, future topics for consideration, decision 1310 to make today 714, and the like. FIG. 7 provides an example of a user home page 700, such as what the user 1314 sees when they are logged into the system account. Here, there may be a display of recent decisions the system recommended, lists of popular topics 708 to get decisions in, a search interface 710 to find topics, status updates about the user 1314 getting benefits for contributing to the system, recent activity 704, access to the user's profile 712, and the like.

Figure 8:
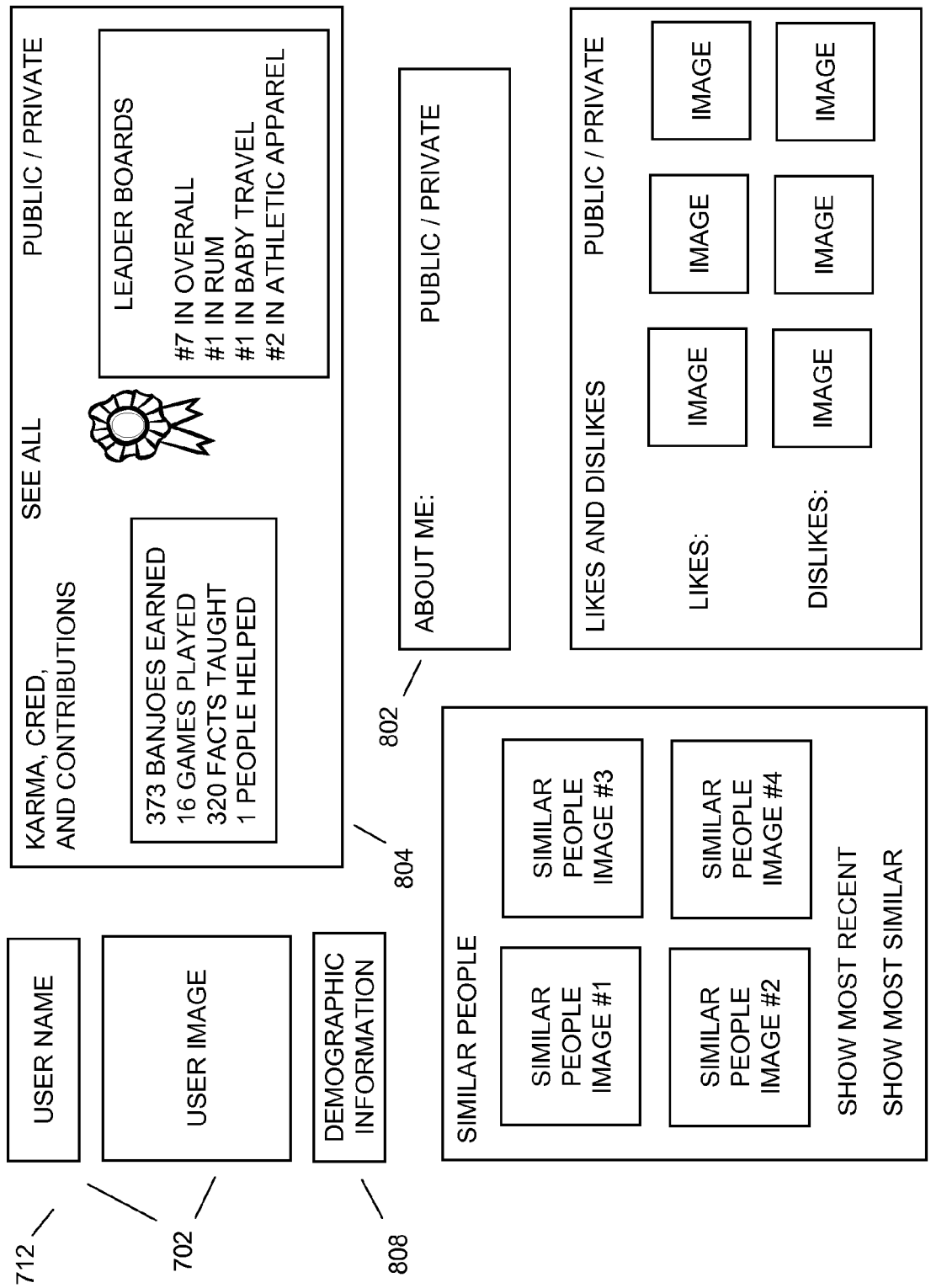

FIGS. 8 and 8A provide an example of a user's profile 712 page showing information about them and their account. The user 1314 may manage user information 802, such as a user's email address, password, and the like. They may also answer questions 1320 about themselves and have these answers remembered 810 and automatically used when they use decision making topics in the system. The user 1314 may also receive rewards 804, such as "badges", and see them displayed as received in response to helping other users, contributing to the system, and the like. Some of these rewards may be based on the quality of the user's contributions, on the quantity of contributions, and the like. In addition, users may be assigned a demographic group 808 of people who answered questions 1320 about themselves similarly.

Figure 9:
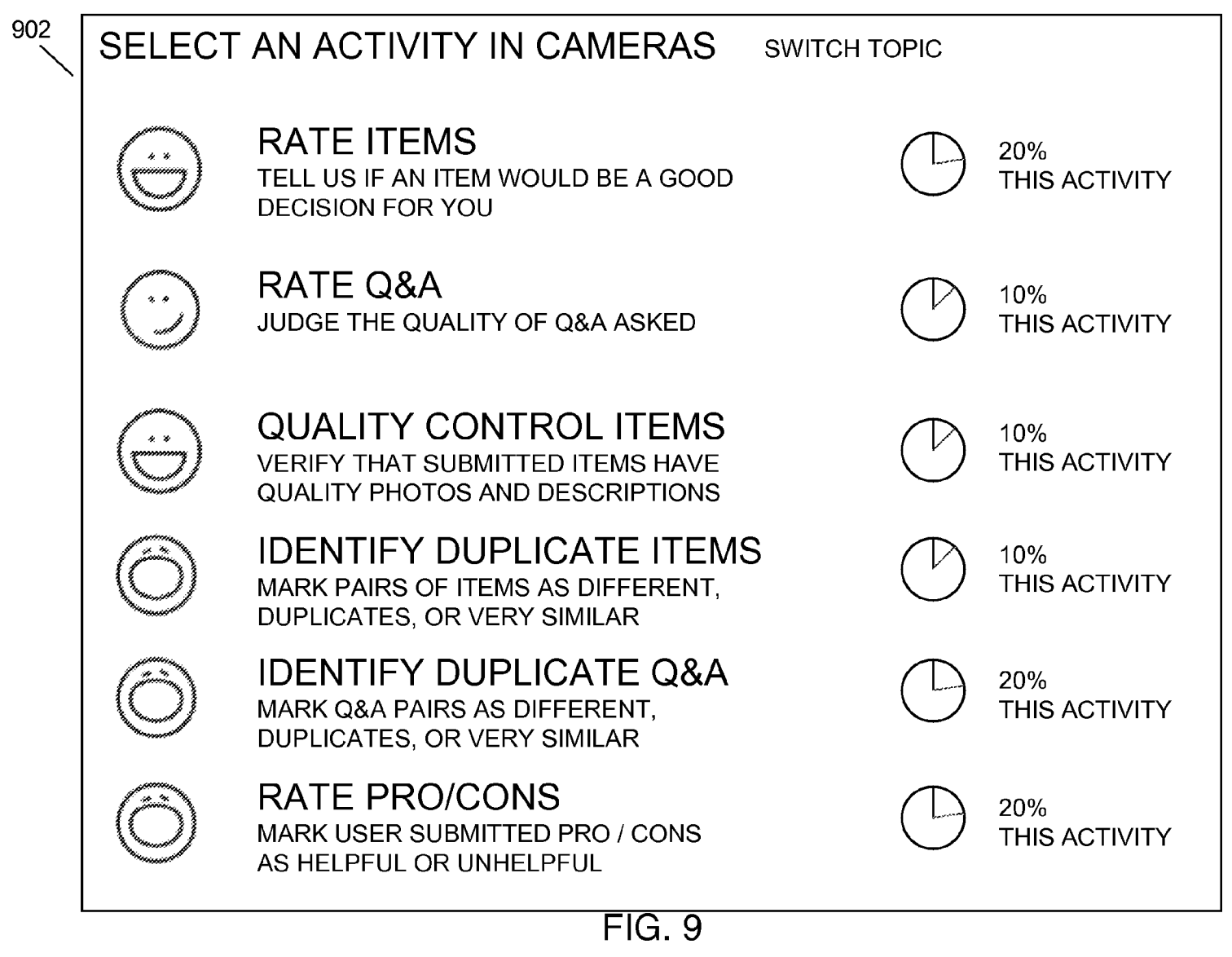

In embodiments, users may be able to decide they want to contribute expertise 902 to the system, such as in a 'teach the system' mode. FIG. 9 shows an example of various links/pages that may allow a user 1314 to contribute, such as giving the system training about various decisions, rating the quality of pictures and user-contributed prose, finding duplicate items and questions, contributing new decision making topics, contributing new questions 1320 to existing topics, and the like.

Figure 10:
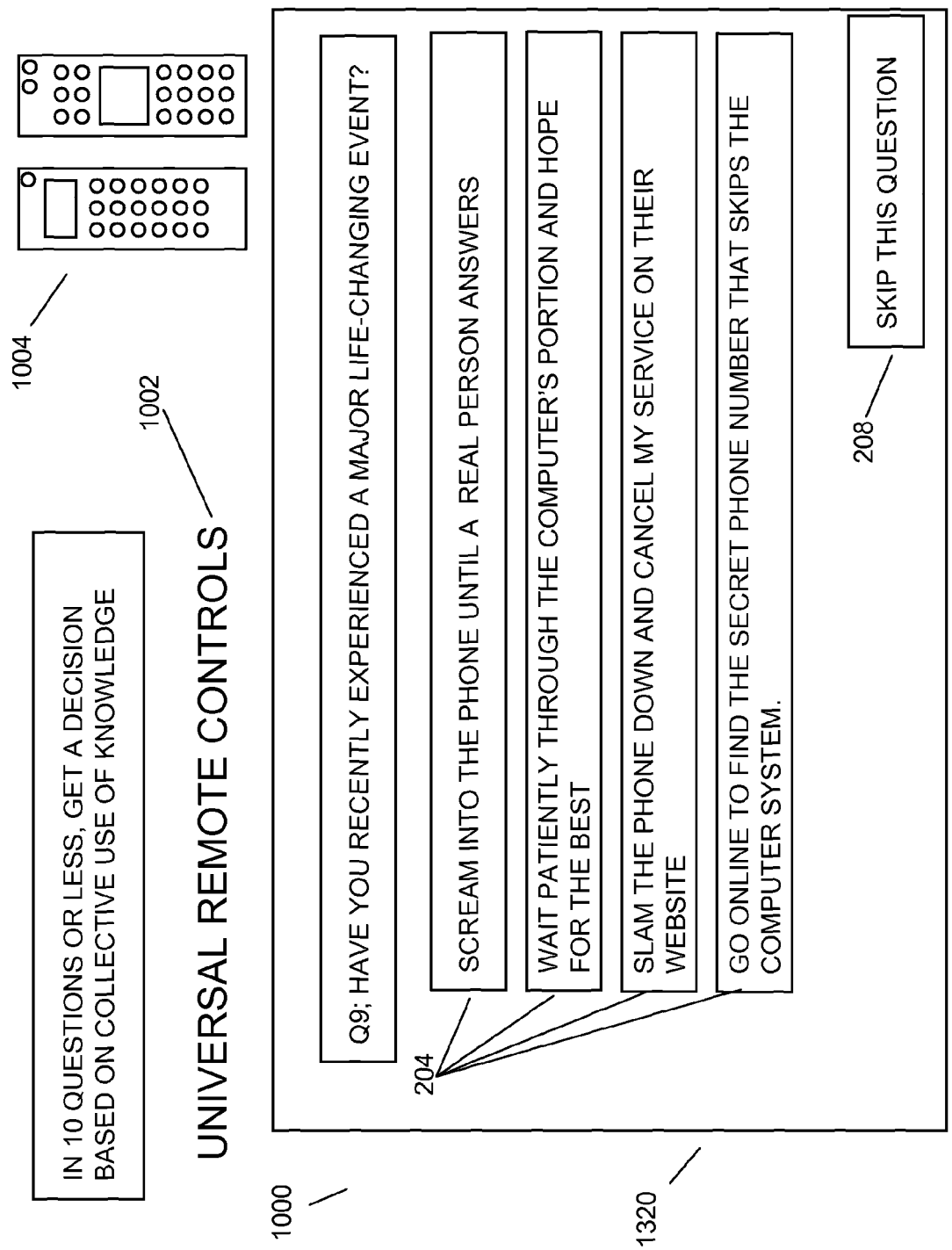
FIG. 10 depicts an example of a user question.

In embodiments, the user, after choosing a topic for the system to make decisions for, may be asked questions. FIG. 10 provides an example of how a question 1320 may be presented 1000 to the user. As shown, the presentation of the question 1320 to the user 1314 may provide different elements, such as a topic heading 1002, a picture or illustration associated with the topic 1004, a question, a set of answer choices, and the like.

Figure 11:
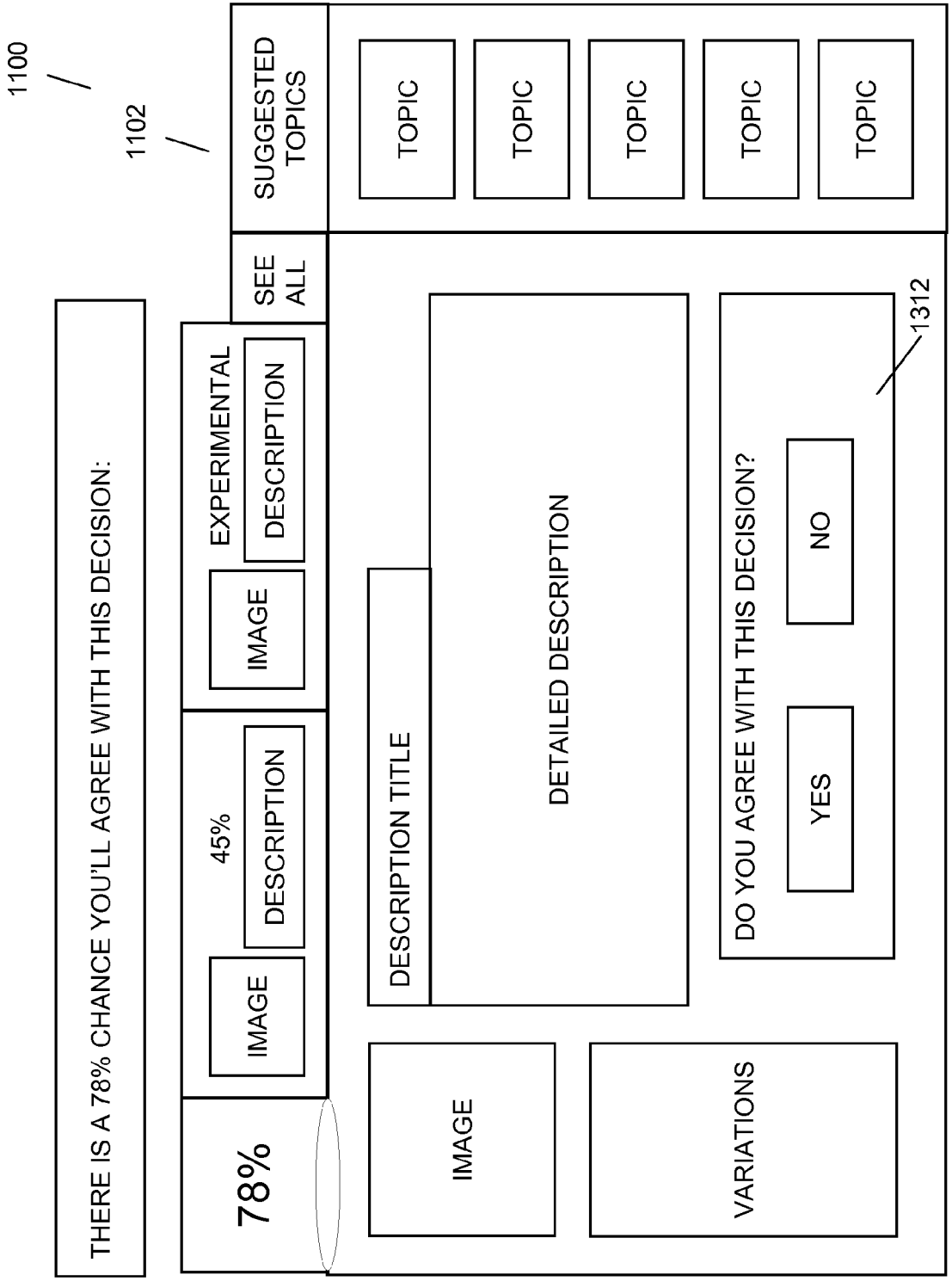

After answering questions, the user 1314 may be provided an answer 1322 or decision 1310 associated with the user's original question. FIGS. 11 and 11A show an example of how a decision 1310 may be presented 1100 to the user, and may include a primary decision, information summarizing the decision, alternate decisions, variations on the decision, and the like. In addition, the user 1314 may be provided with an opportunity to provide feedback 1312 to the system, such as whether the user 1314 agrees with the decision 1310 or not. The user 1314 may also be provided other suggested topics 1102, such as based on the current topic, answers provide, history of answers, a user's profile, a user's history of questions, topics that other users found helpful, and the like.

FIG. 12 shows an example list of decisions 1200 in a topic. For a product topic, such as shown, the "decisions" may be what product to buy. For other topics, the decision 1310 might be "yes, dump him" or "no, don't get a tattoo". The decisions may be ranked and ordered based on their relevancy to the user, based on how the user 1314 answered questions, based on how the user 1314 answered questions 1320 in the topic, and the like. Additionally, the items may be ranked by price, by name, and the like.

In embodiments, the present invention may provide a facility for providing an improved way to provide decisions to a user 1314 with a question 1320 across a broad category of topics, including products, personal, health, business, political, educational, entertainment, the environment, and the like. For example, the system may provide decisions on everything from whether a user 1314 should break up with their boyfriend, to whether you should get a tattoo or not, to whether you can deduct something on your taxes in addition to product decisions, and the like. In embodiments, the system may provide decisions on any interest a user 1314 may have.

In embodiments, the present invention may provide a decision system that is flexible and is capable of changing and growing. This may be partly enabled by the system's use of a dialog of questions 1320 and answers to make a decision, and then getting feedback from the user 1314 so the system can improve. In embodiments, this approach may be significantly more powerful since the system may ask any question 1320 and therefore get much better information from the user 1314 about their wants. In addition, users may be able to extend the system by entering their own questions 1320 and answers for the system to ask, entering in new decisions for the system to make, and the like. The system may then automatically try out newly entered information to see if it is useful or helpful and use this new information to determine if it is useful, and possibly stop asking/using the questions/decisions that may not be as helpful to users. In embodiments, this approach may provide for building a wisdom-of-the-crowds based decision making expert system for potentially any topic.

In embodiments, the present invention may also provide improved decision facility to the user 1314 by providing decisions by ranking across non-traditional feature dimensions. For example, instead of just ranking cameras by price or size, the system may rank cameras based on how much they're liked by retired people, how sexy they look, and the like. The system may then help users navigate across these dimensions. For instance, instead of users just being able to say "I like this camera, but want a cheaper one" the system may let them do things like say "I like this camera but want one better for learning photography" or "I like this vacation, but want one with a more active social scene".

In embodiments, the present invention may lend itself to a variety of different user interfaces, such as a web interface, instant messaging, voice, cell phone, SMS/instant messaging, third party use (e.g. a widget on a third party, web service sold to a third party), and the like. For example, a voice interface may be well suited to the system since there may be a very limited vocabulary that the system must recognize, such as just the possible answers to each question. In this way, if the system can't understand a user response it may just move on to another question 1320 instead of annoying the user 1314 by asking them to repeat their answer over and over. In another example, the present invention may be integrated into a third party site, such as a search for a TV on an e-commerce website, where the present invention is a widget to help the user 1314 narrow down the results, or using the present invention as a widget in association with a real estate website to build an MLS query for the user 1314 to find a house that is a good match for them. In embodiments, the present invention may provide a user interface, both in regard to a physical interface and in the way questions, answers, and decisions are presented, that provides the user 1314 with a significantly improved way to obtain decisions on a great variety of topics.

In embodiments, the present invention may be integrated into third party products in such as way as to improve the third party's user interface and user satisfaction. For example some website services provide predictions through past purchase history. In this case, the present invention may be able to explore a user's mood or intent, such as through asking explicit questions. In the case of search engines, the present invention may be able to detect when the user 1314 is trying to make a decision 1310 and then start to ask them follow on questions. In the case of forum sites, mailing lists, news groups, and the like, the present invention may provide improved access to decisions and decisions that were made by people similar to the user. For example, the present invention may be able to search through all the forum posts to find people who are in the same situation as the user, and providing what decision 1310 the forum community recommended to them.

In embodiments, the present invention may be able to extend e-commerce web application user interfaces. For instance, a user 1314 may start a product search with a keyword search and then ask questions 1320 to narrow down the results to the best decision 1310 for the user. The present invention may be able to provide a Q&A interface for picking a product once the user 1314 clicks into a category page. For example, after clicking cameras on the website, the user 1314 might see a first question. The present invention may be able to rank products along dimensions that are based on how users answer questions. For example, cameras might be ranked from best to worst 'travel camera' based on how people answer 1322 the question "What do you want a camera for?" Answer "Travel" and then whether they give positive or negative feedback to a particular camera. This may allow the e-commerce website to rank a list of camera keyword search results from best to worst travel cameras.

In embodiments, the present invention may be able to provide an improved search engine capability, such as detecting when a user 1314 is trying to make a decision 1310 and switching to a Q&A interface, based on the search results from a keyword search ask follow up questions 1320 to narrow down or re-rank the results, ask questions 1320 in order to build a keyword search query or to refine a search query, learn feedback based on which links a user 1314 clicks after being asked questions, and the like. In addition, the present invention may implicitly learn about the user 1314 and alter rankings based on these implicit facts, such as what time of day they're using the system, where they are in the world, what type of browser they're using, weather where they are, and the like.

In embodiments, the present invention may be able to provide a way for information to be gathered and utilized by users. For instance, Wikipedia is a way for users to contribute information such that the end user 1314 must, to some extent, self validate the accuracy of the information subsequently supplied to them. In a similar fashion, the present invention may be able to host a web application that utilizes user contributed content. For instance, instead of learning what the prices of cameras are, the web application could have users input the prices of cameras and then allow other users to self validate these claims. In this way, the scope of the contributed information may be allowed to grow organically as users interact with the system.

In embodiments, some e-commerce applications may provide for products and/or services that are associated with personal preference, and so may benefit from the present invention. For instance, there are currently several movie rental web services, where the user 1314 selects movies for delivery to their home through the mail. Decisions are also provided to the user 1314 based on what the user 1314 has selected in the past. However, choosing a movie may involve personal interests at the time of rental that cannot be determined by past selections, such as mood, intent, weather, are they going to be alone or with someone, their current personal relationships, and the like. These types of interests may be explored with the present invention through questioning, and as such, may provide a much more personalized match to the user's interests at the time of rental.

In embodiments, local search applications may be improved through the use of the present invention. For example, if a user 1314 wanted a decision 1310 on where to eat dinner, they might search for "dinner in new york" and find a website with suggestions targeted to the query. This interface however falls short when the user 1314 doesn't have a clear idea as to what keywords to include. For instance, the user 1314 might not know the key options for food and might not think to search for 'ethiopian food new york.' The present invention may have the advantage of being able to figure out what question 1320 it should ask in order to narrow down the possibilities. In embodiments, the present invention may be able to aid in the building of a search query.

In embodiments, the present invention may provide for an improved way to match up users and experts, users and other knowledge based users, and the like. For instance, a service may be provided to collect users and experts on different topics. Users may then come to the web interface of the service and enter into a session of Q&A where the best match is determined. As a result of the questions, the system may provide a decision, where the profile of the expert or other user 1314 is provided, and where the user 1314 may be asked if they agree with the recommended individual. In embodiments, the user 1314 may be provided a home page where previous matches and communications may be kept, forwarded to friends, experts rated, and the like.

In embodiments, the present invention may provide a platform for a community based question 1320 and answer 1322 application. For instance, users may post questions 1320 to the system, and other users may be allowed to respond. In such a system, a user 1314 may receive answers from a single user, multiple users, an automated system, and the like, where the user 1314 may be able to choose which answer 1322 they feel is correct. This answer 1322 may be kept private, posted for others to view, posted as the correct answer, provided to the system, and the like. In embodiments, the system may use the questions 1320 and answers to further develop the system, provide more accurate answers to users, sort the answers provided to the user, filter the answers provided to the user, and the like. In addition, users of the system may provide feedback to answers provided by other users, contribute to filtering criteria for eliminating incorrect answers, and the like.

In embodiments, the present invention may be used as entertainment, through machine learning capabilities as described herein. For instance, a user 1314 may provide an input or think of an idea, such as a topic, a keyword, a category, a question, a feeling, and the like, and the system may make a guess as to what it is through a series of questions 1320 and answers. For example, the user 1314 may think of an object, such as baseball, and the system may utilize machine learning capabilities, such as geometric systems, to provide questions 1320 to the user. A typical question 1320 may relate to size, such as 'is it bigger than a toaster?' These questions 1320 may then be answered by the user, such as through multiple choice selection, fill in the blank, true/false, free response, and the like. The system may then continue the question 1320 and answer 1322 sequence until it has a guess, and provide this guess to the user. In embodiments, this process may continue for a fixed number of questions, a random number of questions, a user 1314 specified number of questions, a system determined number of questions, a system specified number of questions, and the like. In embodiments, the system may provide the user 1314 with a user interface, such as through the Internet via a website, through a stand-alone computational device, through a mobile computational device, through a phone service, through a voice interface, in association with an instant messaging service, through text messaging, and the like. In embodiments, the system may be provided to a third party, such as a widget to another website, as an API to a third party application, and the like. In embodiments, the present invention may use non-neural networks for entertainment applications, such as playing games.

In embodiments, the present invention may provide a system to assist in the discovery of new drugs, where the system may provide an aid in the selection and combination of molecules in creating a new drug. For example, the system may ask the user 1314 about information associated with chemical parameters, such as solubility, reactivity, toxicity, and the like, and combine these with questions 1320 to probe the user's expertise in recognizing molecular structures. As the question 1320 and answer 1322 sequence progresses, the system may provide the user 1314 with insights as to which molecular structures may be stable and synthesizable. In embodiments, the process may continue until the user 1314 has an improved sense for what molecular combinations may make for a new drug, until the choice of new exploratory routes are available for presentation to the user, until an new potential drug is identified, and the like.

In embodiments, the present invention may provide for an image finder application, where the user 1314 may be assisted in identifying an image that fits some subjective criteria that is not necessarily explicitly known to the user. For example, a user 1314 may be involved in the development of a brochure for a company, where they have the text for the brochure, but need to select an image to support the ideas and emotions that the text is trying to convey. The user 1314 may in this instance have a subjective idea as to what type of photograph may be required, but not necessarily to the extent that they could specify a search with keywords. The user 1314 may instead first specify the source of the images, such as from a file, a database, a website service, from Google images, from an advertiser image bank, and the like. Then the user 1314 may be asked a series of questions, or be presented with a series of images to choose from. The answers and/or selections that the user 1314 chooses may then be utilized in refining the choices that are next presented to the user, and from which further questions 1320 and/or image selections may be provided. In embodiments, this process may continue until the user 1314 finds an image to select as the final image. Additionally, the system may take the user's 'final selection' and select a group of other similar images for presentation to the user, at which time the user 1314 may choose to continue the process of selection refinement.

In embodiments, the present invention may be used in a baby naming application, where the user 1314 may have only a vague sense of what names they might prefer. The user 1314 may be initially asked different types of questions 1320 intended to provide the system with information to aid in the learning of the user's preferences, such as questions 1320 about family, friends, education, heritage, geographic location, place of birth, hobbies, books read, movies watched, and the like. The system may then continue to learn through the presentation of questions 1320 associated with name preference in a plurality of ways, such as rating name, choosing from a list of names, answering questions 1320 pertaining to name, and the like. In embodiments, this process may continue until the user 1314 finds a name to select as the final name. Additionally, the system may take the user's 'final selection' and select a group of other similar names for presentation to the user, at which time the user 1314 may choose to continue the process of selection refinement.

In embodiments, the present invention may provide decisions for a plurality of topics including, but not limited to, video games, laptops, vacations, cameras, general personality, drinks, cell phones, televisions, grills, watches, coffee machines, toe rings, Halloween, GPS devices, hottest celebrity, your personal hero, presidential election, baby toys, blogs, camcorders, cars, which star wars character are you, credit cards, hair care, skin care, sex and the city, should I get a tattoo, professions, how much allowance, city to live in, dog breeds, fragrance, New York, neighborhood chooser, software, desktop computers, DVD players and recorders, cigars, charities, Broadway shows, speakers, home theater systems, MP3 players, computer networking devices, headphones, memory cards, magazines, books, Oprah picks, books, The New York Times bestsellers, business casual clothing, franchises, cookware, toys, toys—educational, athletic apparel, espresso machines, should I go Greek, should I come out to my parents, should I ask for a raise, do I have a drinking problem, should I medicate my add/ADHD child, vacuum cleaners, clothes washers and dryers, is working at a startup right for me, humidifiers, are you a good friend, risk of developing diabetes, which foreign language should I learn, microwaves, car audio, what kind of customer are you, wine, should I join the military, which military branch should I join, what kind of art will I enjoy, baby and toddler car seats, baby strollers, baby travel accessories, natural and organic beauty products, makeup, home audio receivers and amplifiers, copiers and fax machines, printers, breakup with my boyfriend/girlfriend, which Greek god are you, what game show would I enjoy, computer accessories, which superpower should you have, college, online degree programs, choose a major for college, identity theft prevention, should I hire a personal trainer, should I buy or lease a car, should I have laser eye surgery, what should I do about losing my hair, should I start my own business, should my child start kindergarten, how to entertain my family visiting NYC, OTC pain relievers, do I need a living will, miles or cash for my next flight, best way to whiten my teeth, should I let my daughter wear makeup, is hypnosis likely to cure my bad habit, ED options, sleep aids, OTC allergy pills, how much money to spend on a wedding gift, should I buy the extended warranty, is it better to take the SAT or ACT, personal audio accessories, coffee/espresso drink would I enjoy, video game consoles, jeans, downloadable PC games, snacks, vitamins and supplements, which superhero am I, sunglasses, kitchen gadgets, pillows, beauty accessories, beauty bags and cases, sporting goods, which musical instrument is right for me, should I hire a decorator, electronic readers, where do you belong in a shopping mall, power washers, small business, phone system, how much to tip, should I try Botox, should I get liposuction, risk of skin cancer, should I refinance my home, car services (NYC), microbrewery beer, gourmet chocolates, am I saving enough for retirement, entertainment centers/TV stands, cookbooks, electric shavers, keep sending nieces/nephews bday gifts, luggage, computer projectors, energy/workout bars, razors, gourmet ice creams, online dating, newscasts, makeup, tools and brushes, beauty mirrors and compacts, business books, how soon to call after a first date, places to retire, external hard drives, universal remote controls, walking shoes, should I sell my life insurance policy, how green are you, do I have an eating disorder, baby cribs, diets and diet books, cell phone plans, wedding and engagement rings, am I assertive enough, does my child play video games too much, tax preparation (personal return), should I get a reverse mortgage, cancel plans with friends for a date, children's TV shows, kitchen countertops, bathing supplies, insect repellents, cancer specialist, hospitals, national chain restaurants, cereal, should I have kids now, should I hire a nanny, movies, beef cuts, target calories per day, do I have OCD, home air purifiers, auto air fresheners and purifiers, i-phone applications, gay/lesbian vacations, is it ok to ask my co-worker on a date, is my pre-teen ready to babysit, sports/energy drinks, TV shows, office furniture, motorcycles, reward a child for a good report card, lawn trimmers and edgers, am I too stressed, religion, do you make a good first impression, do you spend too much time online, should I get a new hairstyle, should I homeschool my child, diaper bags, should I use cloth or disposable diapers, dog toys, is my partner cheating on me, classic books should my elderly parent stop driving, am I over my ex, is it lust or love, pedometers and heart rate monitors, chewing gum, weather devices, will gas additives help my car, Orlando theme parks, how big of a turkey should I buy, popular music—new releases, self tanner, tax and money management, software, baby bottles and Sippy cups, baby high chairs and booster seats, baby tethers, toasters and toaster ovens, comforters sheets and bed linens, flatware sets, pet carriers and kennels, cheese, kitchen faucets, casual shoes, dress shoes, beauty electronics, am I saving enough for retirement, mutual fund chooser, steak cuts, what is my D&D alignment, acne and pimple medication, bathroom faucets, home exterior lighting, landscape lighting, lawn mowers, aperitif, cognac, gin, rum, scotch, tequila vodkas, whiskeys, Las Vegas shows, sunscreen, running shoes, US MBA programs, patio and outdoor furniture, kitchen knives, are you a true fan, auto insurance, personal legal services, should I hire a financial advisor, indoor plant selector, delivery services, can I deduct it, pool heaters, sofas, house numbers, contact lenses, birthday gifts, has my career peaked, electronic books, doorknobs & lock sets, snow removal equipment, green home improvement, kids clothing & swimwear, motorcycle helmets, bicycle helmets, juicers, golf clubs, refrigerators, wine coolers, ranges and ovens, air conditioners, Christmas gifts, breakup phrases, cold sore medication, diabetes monitoring devices, smoking cessation, what do I do about the hair on my back, hormones to counteract menopause, hiking backpacks, school backpacks, get a website/domain, e-mail services, web hosting, carpets, power tools, tile, water heaters, outdoor paint, window treatments, fireplace screens, indoor lamps, small business legal services, brunch recipes, ceiling fans, mattresses, Las Vegas hotels and casinos, salsas, love quiz for valentines, how much to spend on client gifts, anniversary gifts, outdoors outerwear, casual outerwear, camping tents, sleeping bags, tires, adventure vacations, music downloads, video downloads, wedding dresses, wedding themes, Manhattan gyms, budget hotel chains, golf courses, ski vacations, US spas, ETF funds, designer handbags, should I declare bankruptcy, 401k as down payment on home, should I see a psychiatrist, self defense, dishware, dishwashers, political parties, new year's resolutions, cruise lines, family vacations, baby food, baby health care products, should I shave my head, t-shirts, online photo services, buy a class graduation ring, summer job/internship, where to volunteer, home alarm systems, diagnose your relationship issues, is she/he hot for me, should I adopt, should my aging parents be driving, online bank accounts, BBQ sauces, frozen pizza, recipe finder, should I re-gift it, bodybuilding supplements, home workout equipment, how many hours of sleep do I need, should I consider plastic surgery, risk of arthritis, risk of heart disease, risk of osteoporosis, do I have a gambling problem, best dance to learn, bicycles, cat food, dog food, hobby recommender, martial arts, poster art, outdoor flower selector, which Muppet are you, activities for kids, how ethical are you, should I baptize my child, Miami hotels, US national parks, motor oils, automotive video, blouses, coats, dresses, glasses frames, hosiery, interview clothes, jackets, negligee, pants, shirts, skirts, hats, phones-land lines, steakhouses, which birth method is right for you, summer camp recommender, march madness bracket chooser, baby formula, New York bakeries, fractional jet ownership, how self confident am I, digital photo frames, do I need an accountant, does my child have ADD/ADHD, document shredders, baby monitors, green home improvement, conference phones, and the like.

Figure 13:
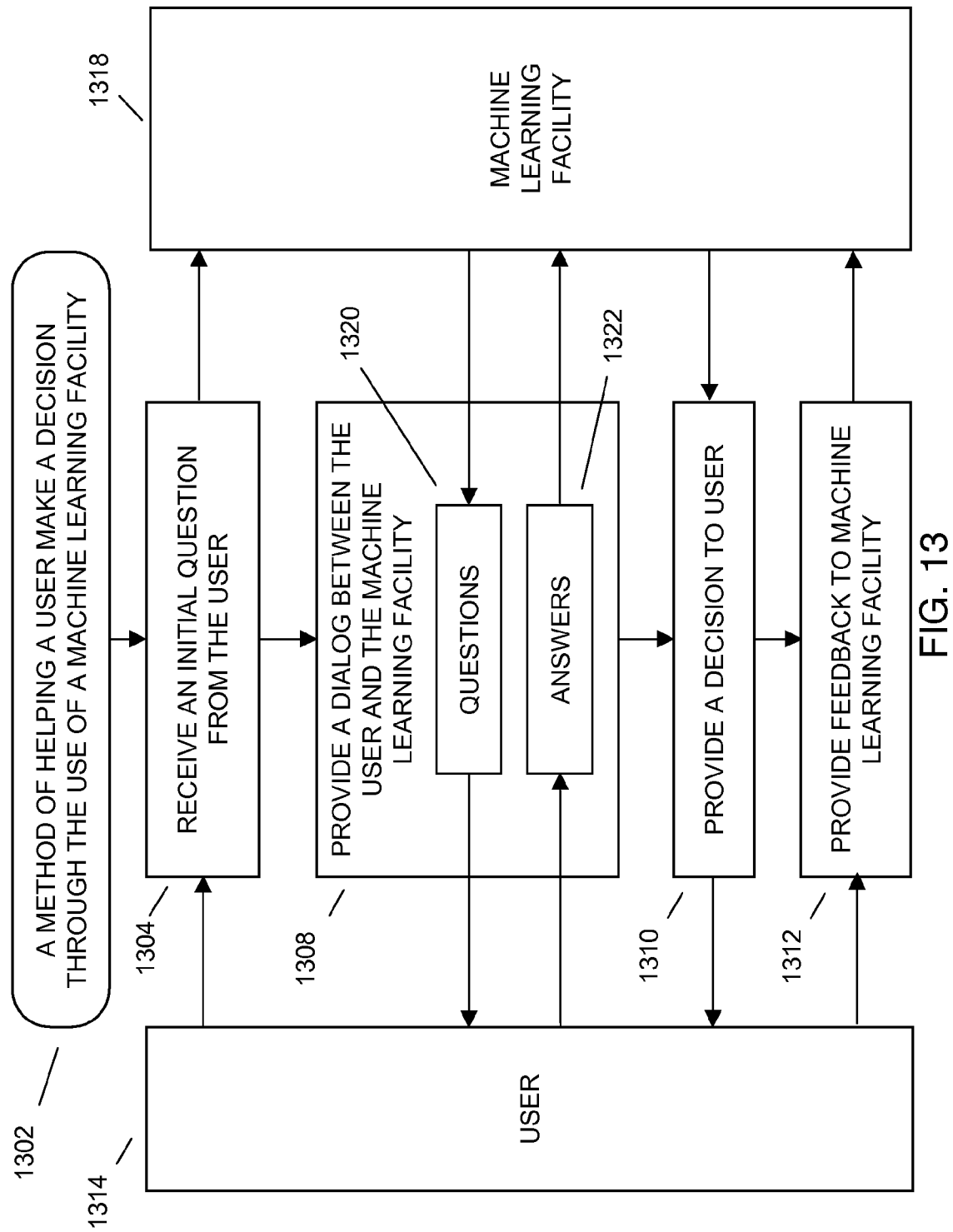
FIG. 13 depicts an embodiment process flow for the present invention.

In embodiments, and as depicted in FIG. 13, the present invention may help a user 1314 make a decision 1310 through the use of a machine learning facility 1302. The process may begin with an initial question 1320 being received 1304 by the machine learning facility 1318 from the user 1314. The user 1314 may then be provided with a dialog 1308 consisting of questions 1320 from the machine learning facility 1318 and answers 1322 provided by the user 1314. The machine learning facility 1318 may then provide a decision 1310 to the user based on the dialog 1308 and pertaining to the initial question 1304, such as a recommendation, a diagnosis, a conclusion, advice, and the like. In embodiments, future questions 1320 and decisions 1310 provided by the machine learning facility 1318 may be improved through feedback 1312 provided by the user 1314.

In embodiments, the initial question 1304 posed by the user 1314 may be an objective question, a subjective question, and the like. A question 1320 may be provided from amongst a broad category of topics, such as topics pertaining to a product, personal information, personal health, economic health, business, politics, education, entertainment, the environment, and the like. The questions 1320 may be in the form of a multiple choice question, a yes-no question, a rating, a choice of images, a personal question, and the like. The questions 1320 may be about the user 1314, provided by another user, provided by an expert, and the like. The questions 1320 may be based on a previous answer, such as from the current dialog 1308 with the user 1314, from a stored previous dialog 1308 with the user 1314, from a stored previous dialog 1308 with another user. The question 1320 may be a pseudo random question, such as a test question, an exploration question 1320 that helps select a pseudo random decision 1310 on the chance that the pseudo random decision 1310 turns out to be useful, and the like. The questions 1320 may include at least one image as part of the question. The questions 1320 may be along psychographic dimensions. In embodiments, the questions 1320 may not be asked directly to the user 1314, but rather determined from contextual information, such as through an IP address, the location of the user, the weather at the user's location, a domain name, related to path information, related to a recent download, related to a recent network access, related to a recent file access, and the like.

In embodiments, the dialog 1308 may continue until the machine learning facility 1318 develops a high confidence in a reduced set of decisions, such as a reduced set of decisions presented to the user, a single decision 1310 presented to the user. The decision 1310 provided by the machine learning facility 1318 may be independent of the order of questions in the dialog 1308. The decision 1310 may provide an alternate decision 1310 when at least one question 1320 in the dialog is omitted, where the alternate decision 1310 may be different based on the machine learning facility 1318 having less information from the user 1314. The decision 1310 may display a ranking of decision choices, such as ranking decisions across non-traditional feature dimensions. The decision 1310 may display at least one image related to the decision 1310. The decision 1310 may be a pseudo random decision on the chance that the pseudo random decision 1310 turns out to be useful, such as the pseudo random decision being part of a system of exploration, where the system of exploration may improve the effectiveness of the system, the machine learning facility 1318 may learn from exploration, and the like.

In embodiments, the feedback 1312 provided may be related to, or derived from, how the user 1314 answers questions 1320 in the dialog 1308, how the user 1314 responds to the decision 1310 provided by the machine learning facility 1318, and the like. In embodiments, the feedback 1312 may be solicited from the user 1314.

In embodiments, users 1314 may extend the learning of the machine learning facility 1318 by entering new information, where the new information may be their own topic, question, answer, decision, and the like. The machine learning facility 1318 may use the new information to determine whether the new information is helpful to users.

In embodiments, a user interface may be provided for user interaction with the machine learning facility 1318, such as associated with a web interface, instant messaging, a voice interface, a cell phone, with SMS, and the like.

In embodiments, the present invention may help a user make a decision 1310 through the use of a machine learning facility 1318. The process may begin with an initial question 1304 being received by the machine learning facility 1318 from the user 1314, where the initial question 1304 may be associated with one of a broad category of topics, such as product, personal, health, business, political, educational, entertainment, environment, and the like. The user 1314 may then be provided with a dialog 1308 consisting of questions 1320 from the machine learning facility 1318 and answers 1322 provided by the user 1314. The machine learning facility 1318 may then provide a decision 1310 to the user 1314 based on the dialog 1308 and pertaining to the initial question 1304, such as a recommendation, a diagnosis, a conclusion, advice, and the like. In embodiments, future questions 1320 and decisions 1310 provided by the machine learning facility 1318 may be improved through feedback 1312 provided by the user 1314.

Figure 14:
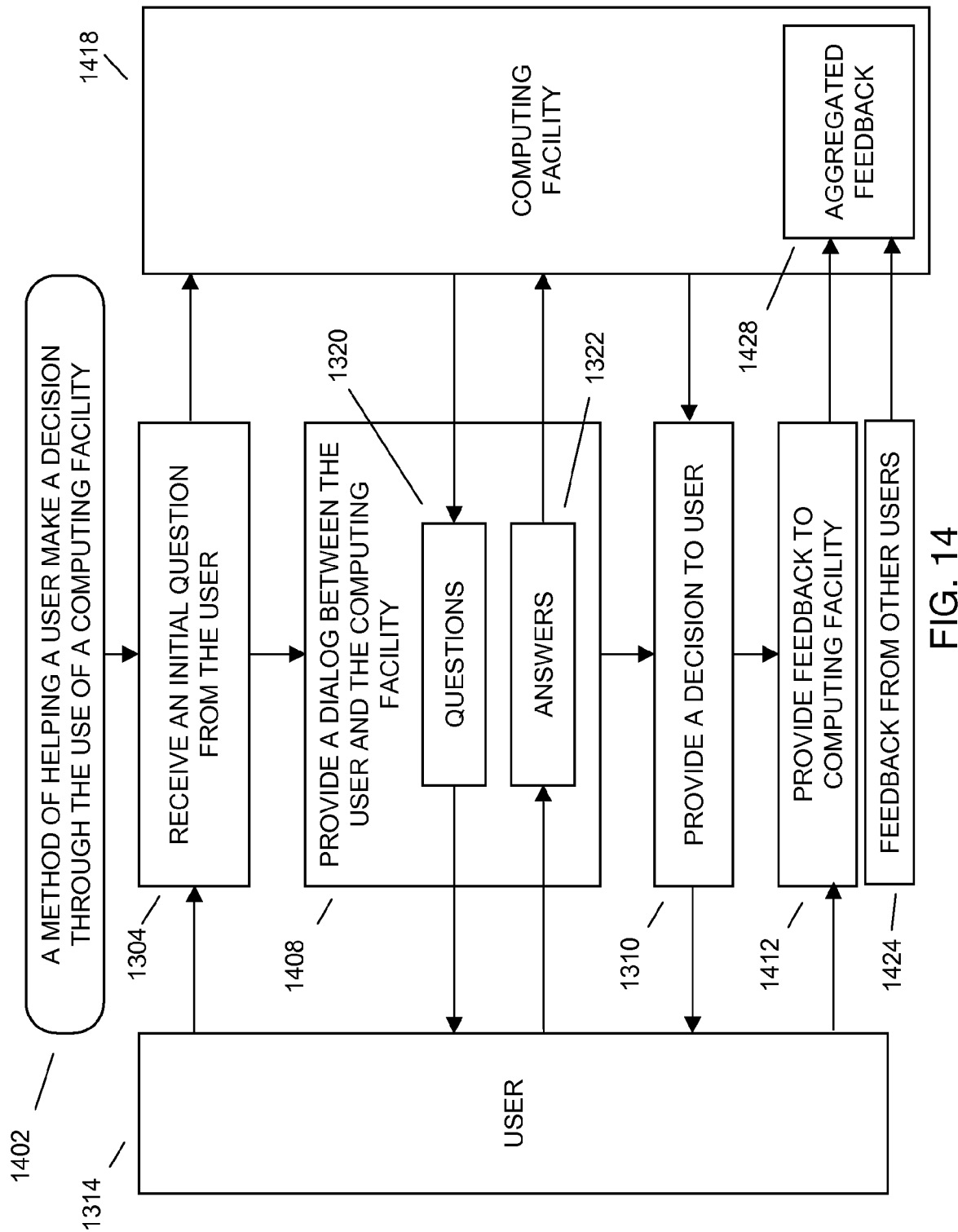
FIG. 14 depicts an embodiment process flow for the present invention.

In embodiments, and as depicted in FIG. 14, the present invention may help a user make a decision 1310 through the use of a computing facility 1402. The process may begin with an initial question 1304 being received by the computing facility 1418 from the user 1314. The user 1314 may then be provided with a dialog 1408 consisting of questions 1320 from the computing facility 1418 and answers 1322 provided by the user 1314. The computing facility 1418 may then provide a decision 1310 to the user 1314 based on an aggregated feedback 1428 from the feedback from a plurality of users 1412. In embodiments, the computer facility 1418 may improve future questions 1320 and decisions 1310 provided by the computing facility 1418 based on receiving feedback 1412 from the user.

In embodiments, the present invention may help a user make a decision 1310 through the use of a machine learning facility 1318. The process may begin with an initial question 1304 being received by the machine learning facility 1318 from the user 1314. The user 1314 may then be provided with a dialog 1308 consisting of questions 1320 from the machine learning facility 1318 and answers 1322 provided by the user 1314, where the number of questions 1320 and answers 1322 provided through the dialog 1308 may determine the quality of the decision 1310. The machine learning facility 1318 may then provide a decision 1310 to the user based on the dialog 1308 and pertaining to the initial question 1304, such as a recommendation, a diagnosis, a conclusion, advice, and the like. In embodiments, future questions 1320 and decisions 1310 provided by the machine learning facility 1318 may be improved through feedback 1312 provided by the user. In embodiments, the quality may be high when the number of questions 1320 and answers 1322 large, such as greater than 10 questions, greater than 15 questions, greater than 10 questions, and the like. In embodiments, the quality may be good quality when the number of questions 1320 and answers 1322 is small, such as less than 10 questions, less than 5 questions, less than 3 questions, one question, and the like.

Figure 15:
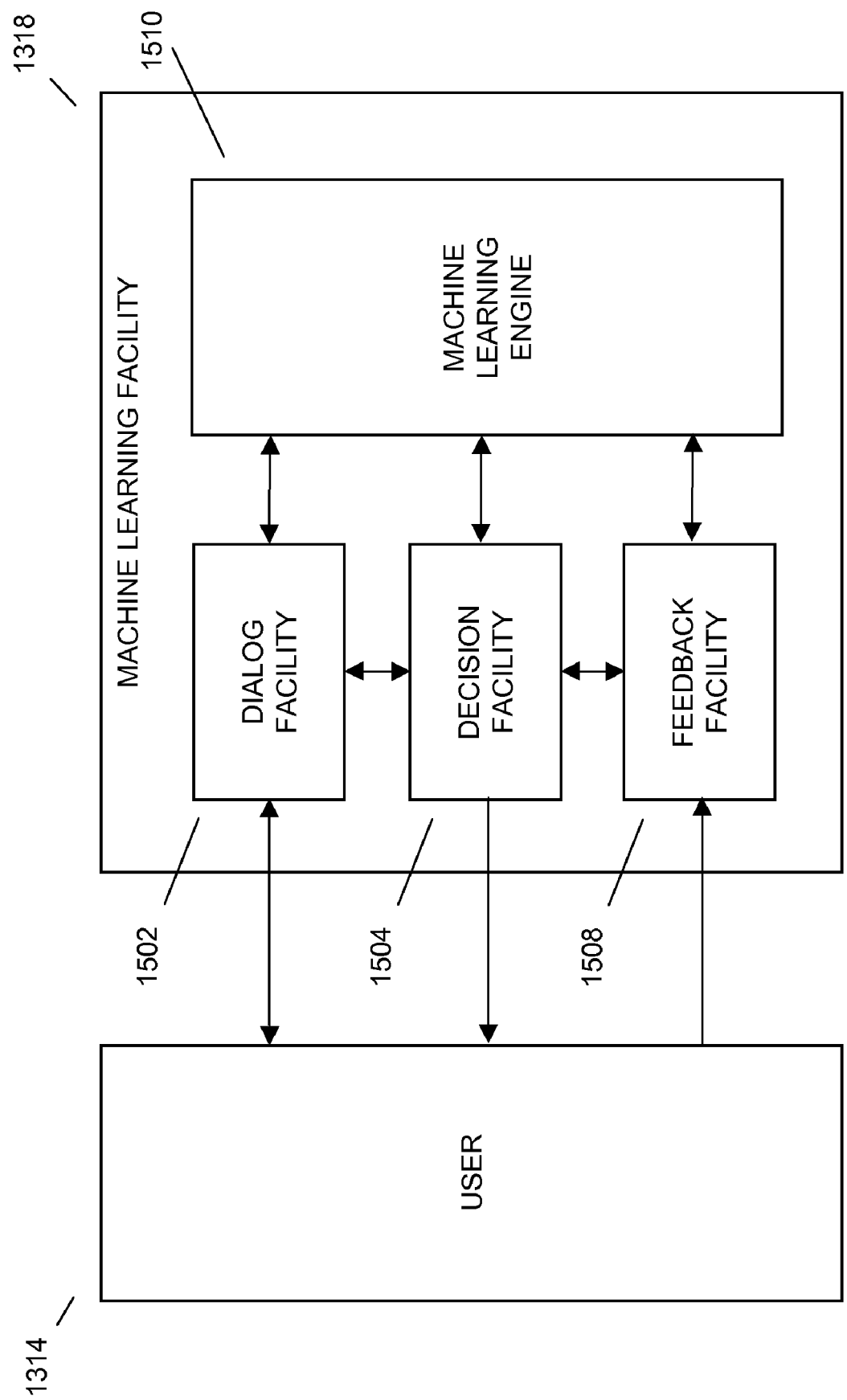
FIG. 15 depicts an embodiment of a block diagram for the present invention.

In embodiments, and as depicted in FIG. 15, the present invention may make a decision 1310 through the use of a machine learning facility 1318. The system may include a machine learning facility 1318 that may receive an initial question 1304 from the user 1314, a dialog facility 1502 within the machine learning facility 1318 providing the user 1314 with questions 1320 and accepting answers 1322 from the user, the machine learning facility 1318 providing a decision 1310 from a decision facility 1504 to the user 1314, and the like. In embodiments, the decision 1310 provided to the user 1314 may be based on the exchange of dialog 1308 between the user 1314 and the machine learning facility 1318, and pertain to the initial question 1304. Further, the machine learning facility 1318 may receive feedback 1312 through a feedback facility 1508 from the user 1314 to improve future questions 1320 and decisions 1310 provided by the machine learning facility 1318.

In embodiments, the present invention may help a user 1314 make a decision 1310 through the use of a machine learning facility 1318. The process may begin with an initial question 1304 being received by the machine learning facility 1318 from the user 1314 through a third party, such as a search application, a social network application, a service provider, a comparison shopping engine, a media company's web environment, and the like. The user 1314 may then be provided with a dialog 1308 consisting of questions 1320 from the machine learning facility 1318 and answers 1322 provided by the user 1314. The machine learning facility 1318 may then provide a decision 1310 to the user 1314 based on the dialog 1308 and pertaining to the initial question 1304, such as a recommendation, a diagnosis, a conclusion, advice, and the like. In embodiments, future questions 1320 and decisions 1310 provided by the machine learning facility 1318 may be improved through feedback 1312 provided by the user 1314.

In embodiments, the present invention may help a user 1314 make a decision 1310 through the use of a machine learning facility 1318. The process may begin with an initial question 1304 being received by the machine learning facility 1318 from the user 1314 through a third party search application, where the user 1314 begins with a keyword search on the third party search application and then is provided a dialog 1308 consisting of questions 1320 from the machine learning facility 1318 and answers 1322 provided by the user 1314. The machine learning facility 1318 may then provide a decision 1310 to the user 1314 based on the dialog 1308 and pertaining to the initial question 1304, where the decision 1310 may be provided back to the third party search application, such as in the form of a sorted list.

In embodiments, the present invention may help a user 1314 make a decision 1310 through the use of a machine learning facility 1318. The process may begin with an initial question 1304 being received by the machine learning facility 1318 from the user 1314. The user 1314 may then be provided with a dialog 1308 consisting of questions 1320 from the machine learning facility 1318 and answers 1322 provided by the user 1314, where the machine learning facility 1318 may utilize third party information, functions, utilities, and the like. The machine learning facility 1318 may then provide a decision 1310 to the user 1314 based on the dialog 1308 and pertaining to the initial question 1304, such as a recommendation, a diagnosis, a conclusion, advice, and the like. In embodiments, third party information, functions, utilities, and the like, may include an application programming interface (API) enabling the collection of cost information, product information, personal information, topical information, and the like.

In embodiments, the present invention may help a user 1314 make a decision 1310 through the use of a machine learning facility 1318. The process may begin with an initial question 1304 being received by the machine learning facility 1318 from the user 1314 through a third party search application, where the user 1314 begins with a keyword search on the third party search application and then is provided a dialog 1308 consisting of questions 1320 from the machine learning facility 1318 and answers 1322 provided by the user 1314 The machine learning facility 1318 may then provide a decision 1310 to the user 1314 based on the dialog 1308 and pertaining to the initial question 1304, such as a recommendation, a diagnosis, a conclusion, advice, and the like. In embodiments, the decision 1310 may be provided back to the third party search application based at least in part on collaborative filtering.

In embodiments, the present invention may help a user 1314 make a decision 1310 through the use of a machine learning facility 1318. The process may begin with an initial question 1304 being received by the machine learning facility 1318 from the user 1314. The user 1314 may then be provided with a dialog 1308 consisting of questions 1320 from the machine learning facility 1318 and answers 1322 provided by the user 1314. The machine learning facility 1318 may then provide at least one image with the decision 1310 to the user 1314 based on the dialog 1308 and pertaining to the initial question 1304, such as a recommendation, a diagnosis, a conclusion, advice, and the like. In embodiments, the image may be a photograph, a drawing, a video image, an advertisement, and the like.

In embodiments, the present invention may help a user 1314 make a decision 1310 through the use of a machine learning facility 1318. The process may begin with an initial question 1304 being received by the machine learning facility 1318 from the user 1314. The user 1314 may then be provided with a dialog 1308 consisting of questions 1320 from the machine learning facility 1318 and answers 1322 provided by the user 1314 where the questions 1320 may be determined at least in part from learning from other users of the machine learning facility 1318. The machine learning facility 1318 may then provide a decision 1310 to the user 1314 based on the dialog 1308 and pertaining to the initial question 1304, such as a recommendation, a diagnosis, a conclusion, advice, and the like. In embodiments, the decision 1310 may be based at least in part on learning from decisions 1310 provided by other users of the machine learning facility 1318.

In embodiments, the present invention may help a user 1314 make a decision 1310 through the use of a machine learning facility 1318. The process may begin with an initial question 1304 being received by the machine learning facility 1318 from the user 1314. The user 1314 may then be provided with a dialog 1308 consisting of questions 1320 from the machine learning facility 1318 and answers 1322 provided by the user 1314. The machine learning facility 1318 may then provide a decision 1310 to the user 1314 based on the dialog 1308 and pertaining to the initial question 1304, such as a recommendation, a diagnosis, a conclusion, advice, and the like. In embodiments, the decision 1310 may be based at least in part on collaborative filtering.

In embodiments, the present invention may help a user 1314 make a decision 1310 through the use of a machine learning facility 1318. The process may begin with an initial question 1304 being received by the machine learning facility 1318 from the user 1314. The user 1314 may then be provided with a dialog 1308 consisting of questions 1320 from the machine learning facility 1318 and answers 1322 provided by the user 1314. The machine learning facility 1318 may then provide a decision 1310 to the user 1314 based on the dialog 1308 and pertaining to the initial question 1304, such as a recommendation, a diagnosis, a conclusion, advice, and the like. In embodiments, the decision 1310 may be based at least in part on collaborative filtering whose context is provided through the dialog 1308, such as at least one question providing the context for the collaborative filtering.

In embodiments, the present invention may help a user 1314 make a decision 1310 through the use of a machine learning facility 1318. The process may begin with an initial question 1304 being received by the machine learning facility 1318 from the user 1314. The user 1314 may then be provided with a dialog 1308 consisting of questions 1320 from the machine learning facility 1318 and answers 1322 provided by the user 1314. The machine learning facility 1318 may then provide a decision 1310 to the user 1314 based on the dialog 1308 and pertaining to the initial question 1304, such as a recommendation, a diagnosis, a conclusion, advice, and the like. In embodiments, the decision 1310 may be based only on information gathered through a plurality of user 1314s of the machine learning facility 1318 and pertaining to the initial question 1304, where at least one of the plurality of user 1314s of the machine learning facility 1318 may be the user 1314 associated with the dialog 1308.

In embodiments, the present invention may help a user 1314 make a decision 1310 through the use of a machine learning facility 1318. The process may begin with an initial question 1304 being received by the machine learning facility 1318 from the user 1314. The user 1314 may then be provided with a dialog 1308 consisting of questions 1320 from the machine learning facility 1318 and answers 1322 provided by the user 1314. The machine learning facility 1318 may then provide a decision 1310 to the user 1314 based on the dialog 1308 and pertaining to the initial question 1304, and with limited initial machine learning facility 1318 knowledge on the subject matter of the initial question 1304. In embodiments, the limited initial machine learning facility 1318 knowledge may be seed knowledge, may be limited to basic knowledge associated with the subject matter of the initial question 1304, may be limited to basic knowledge associated with the subject matter of the initial question 1304 where the basic knowledge may be expert knowledge.

In embodiments, the present invention may help a user 1314 make a decision 1310 through the use of a machine learning facility 1318. The process may begin with an initial question 1304 being received by the machine learning facility 1318 from the user 1314. The user 1314 may then be provided with a dialog 1308 consisting of questions 1320 from the machine learning facility 1318 and answers 1322 provided by the user 1314. The machine learning facility 1318 may then provide a decision 1310 to the user 1314 based on the dialog 1308 and pertaining to the initial question 1304, such as a recommendation, a diagnosis, a conclusion, advice, and the like, where the decision 1310 may be based on learning from a combination of expert and user inputs.

In embodiments, the present invention may help a user 1314 make a decision 1310 through the use of a machine learning facility 1318. The process may begin with an initial question 1304 being received by the machine learning facility 1318 from the user 1314. The user 1314 may then be provided with a dialog 1308 consisting of questions 1320 from the machine learning facility 1318 and answers 1322 provided by the user 1314. The machine learning facility 1318 may then provide a category-based decision 1310 to the user 1314 based on the dialog 1308 and pertaining to the initial question 1304, such as a recommendation, a diagnosis, a conclusion, advice, and the like.

In embodiments, the present invention may help a user 1314 make a decision 1310 through the use of a machine learning facility 1318. The process may begin with an initial question 1304 being received by the machine learning facility 1318 from the user 1314. The user 1314 may then be provided with a dialog 1308 consisting of questions 1320 from the machine learning facility 1318 and answers 1322 provided by the user 1314. The machine learning facility 1318 may then provide a decision 1310 to the user 1314 where the machine learning facility 1318 may utilize responses from a plurality of user 1314s of the machine learning facility 1318 to categorize and provide decisions 1310 along at least one of psychographic and demographic dimensions.

In embodiments, the present invention may provide a user 1314 with a response through the use of a machine learning facility 1318. The user 1314 may be provided with a dialog 1308 consisting of questions 1320 from the machine learning facility 1318 and answers 1322 provided by the user 1314, where the questions 1320 from the machine learning facility 1318 may be related to an application, such as an entertainment application, a drug discovery application, a baby name application, and the like. The machine learning facility 1318 may then provide the response to the user 1314 based on the dialog 1308 and pertaining to the initial question 1304, such as a recommendation, a diagnosis, a conclusion, advice, and the like. In embodiments, future questions 1320 and decisions 1310 provided by the machine learning facility 1318 may be improved through feedback 1312 provided by the user 1314.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method of helping a user make a decision through the use of a machine learning facility, comprising:
    creating a profile for the user through a sequence of questions presented from the machine learning facility to the user during a registration process;
    receiving an initial question at the machine learning facility from the user;
    providing the user with a dialog consisting of questions from the machine learning facility and answers provided by the user, wherein at least one of the questions from the machine learning facility is selected based upon the profile;
    including at least one randomly selected question in the dialogue, wherein the at least one randomly selected question is used to train the machine learning facility upon reaching a decision; and
    providing the decision to the user from the machine learning facility, wherein the decision is a single answer to the initial question from the user based on the dialog and the profile.

2. The method of claim 1, wherein the decision is a recommendation.

3. The method of claim 1, wherein the decision is a diagnosis.

4. The method of claim 1, wherein the initial question is associated by the user with one of a broad category of topics.

5. The method of claim 4, wherein the one of the broad category of topics is a product.

6. The method of claim 4, wherein the one of the broad category of topics is health.

7. The method of claim 4, wherein the one of the broad category of topics is business.

8. The method of claim 4, wherein the one of the broad category of topics is political.

9. The method of claim 4, wherein the one of the broad category of topics is educational.

10. The method of claim 4, wherein the one of the broad category of topics is entertainment.

11. The method of claim 4, wherein the one of the broad category of topics is environment.

12. The method of claim 1, wherein the initial question is about the user.

13. The method of claim 1, wherein the decision includes at least one image.

14. The method of claim 1, wherein the dialogue continues until the machine learning facility develops a predetermined level of confidence in the single answer.

15. The method of claim 1, wherein the decision includes one or more additional answers, each of the one or more additional answers ranked according to a level of confidence.

16. The method of claim 1, wherein the decision is a pseudo random decision presented to the user with a request for user feedback on whether the pseudo random decision is helpful.

17. The method of claim 1 wherein the at least one randomly selected question is randomly selected from a plurality of suggested questions provided by users after completion of previous instances of a user dialogue related to the initial question.

18. A computer program product embodied in a non-transitory computer readable medium that, when executing on one or more computing devices, performs the steps of:
    creating a profile for the user through a sequence of questions presented from the machine learning facility to the user during a registration process;
    receiving an initial question at the machine learning facility from the user;
    providing the user with a dialog consisting of questions from the machine learning facility and answers provided by the user, wherein at least one of the questions from the machine learning facility is selected based upon the profile;
    including at least one randomly selected question in the dialogue, wherein the at least one randomly selected question is used to train the machine learning facility upon reaching a decision; and providing the decision to the user from the machine learning facility, wherein the decision is a single answer to the initial question from the user based on the dialog and the profile.

19. A server comprising a memory, a processor, and an interface to access devices through a network, wherein the processor is configured to perform the steps of:

creating a profile for the user through a sequence of questions presented from the machine learning facility to the user during a registration process;

receiving an initial question at the machine learning facility from the user;

providing the user with a dialog consisting of questions from the machine learning facility and answers provided by the user, wherein at least one of the questions from the machine learning facility is selected based upon the profile;

including at least one randomly selected question in the dialogue, wherein the at least one randomly selected question is used to train the machine learning facility upon reaching a decision; and providing the decision to the user from the machine learning facility, wherein the decision is a single answer to the initial question from the user based on the dialog and the profile.

* * * * *